US008813543B2

(12) United States Patent
Douglas

(10) Patent No.: US 8,813,543 B2
(45) Date of Patent: Aug. 26, 2014

(54) METHOD AND APPARATUS FOR DETERMINING IMBALANCE CORRECTION WEIGHT AMOUNTS FOR APPLICATION DURING VEHICLE WHEEL BALANCING

(75) Inventor: Michael W. Douglas, St. Charles, MO (US)

(73) Assignee: Hunter Engineering Company, St. Louis, MO (US)

( * ) Notice: Subject to any disclaimer, the term of this patent is extended or adjusted under 35 U.S.C. 154(b) by 957 days.

(21) Appl. No.: 12/945,185

(22) Filed: Nov. 12, 2010

(65) Prior Publication Data
US 2011/0056277 A1  Mar. 10, 2011

Related U.S. Application Data

(60) Division of application No. 12/644,588, filed on Dec. 22, 2009, now Pat. No. 8,061,200, which is a continuation of application No. 11/952,809, filed on Dec. 7, 2007, now Pat. No. 7,658,108, which is a continuation of application No. 11/207,974, filed on Aug. 19, 2005, now Pat. No. 7,320,248, which is a continuation-in-part of application No. 11/127,386, filed on May 12, 2005, now Pat. No. 7,594,436, which is a continuation-in-part of application No. 10/648,165, filed on Aug. 26, 2003, now Pat. No. 6,952,964, which is a continuation-in-part of application No. 10/455,623, filed on Jun. 5, 2003, now abandoned.

(51) Int. Cl.
*G01M 1/00* (2006.01)
(52) U.S. Cl.
USPC ............................................................ 73/66

(58) Field of Classification Search
USPC .................................... 73/457–460, 468
See application file for complete search history.

(56) References Cited

U.S. PATENT DOCUMENTS

| 2,080,227 | A | 9/1935 | Periat et al. |
| 4,441,355 | A | 4/1984 | Rothamel |
| RE31,971 | E | 8/1985 | Gold |
| 4,555,943 | A | 12/1985 | Ohta et al. |
| 4,854,168 | A | 8/1989 | Himmler |
| 4,891,981 | A | 1/1990 | Schonfeld |
| 5,171,067 | A | 12/1992 | Kawabe et al. |
| 5,365,786 | A | 11/1994 | Douglas |
| 5,396,436 | A | 3/1995 | Parker et al. |
| 5,454,627 | A | 10/1995 | Kawabe et al. |
| 5,591,909 | A | 1/1997 | Rothamel et al. |
| 5,915,274 | A | 6/1999 | Douglas |
| 6,079,268 | A | 6/2000 | Metzner |
| 6,122,957 | A | 9/2000 | Bux et al. |
| 6,481,282 | B2 | 11/2002 | Douglas et al. |
| 6,484,574 | B1 | 11/2002 | Douglas et al. |
| 2005/0132786 | A1 | 6/2005 | Cullum et al. |

*Primary Examiner* — Peter Macchiarolo
*Assistant Examiner* — Tamiko Bellamy
(74) *Attorney, Agent, or Firm* — Polster Lieder

(57) ABSTRACT

A method for reducing imbalance correction weight usage during a balancing operation of a vehicle wheel assembly. An imbalance of the vehicle wheel assembly is initially determined and utilized together with an established acceptable threshold of imbalance for the vehicle wheel assembly to compute a reduced imbalance value having a magnitude less than the determined imbalance. Using the reduced imbalance value, correction weight amounts and placement locations for application to the vehicle wheel assembly are identified. Determined differences between the identified correction weight amount using the reduced imbalance value and a convention correction weight amount are identified as imbalance correction weight savings.

10 Claims, 13 Drawing Sheets

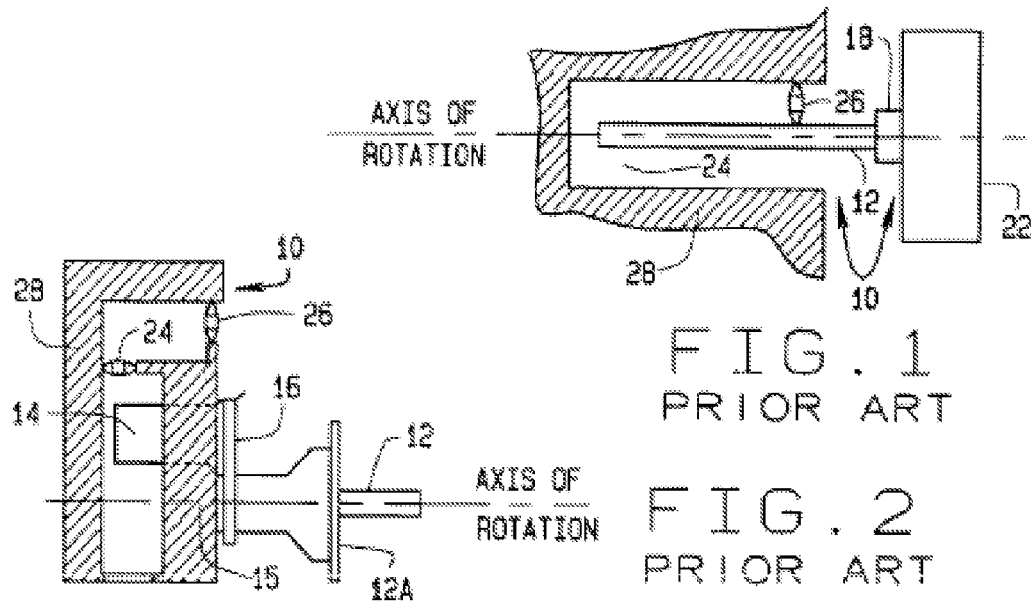
FIG. 1 PRIOR ART
FIG. 2 PRIOR ART
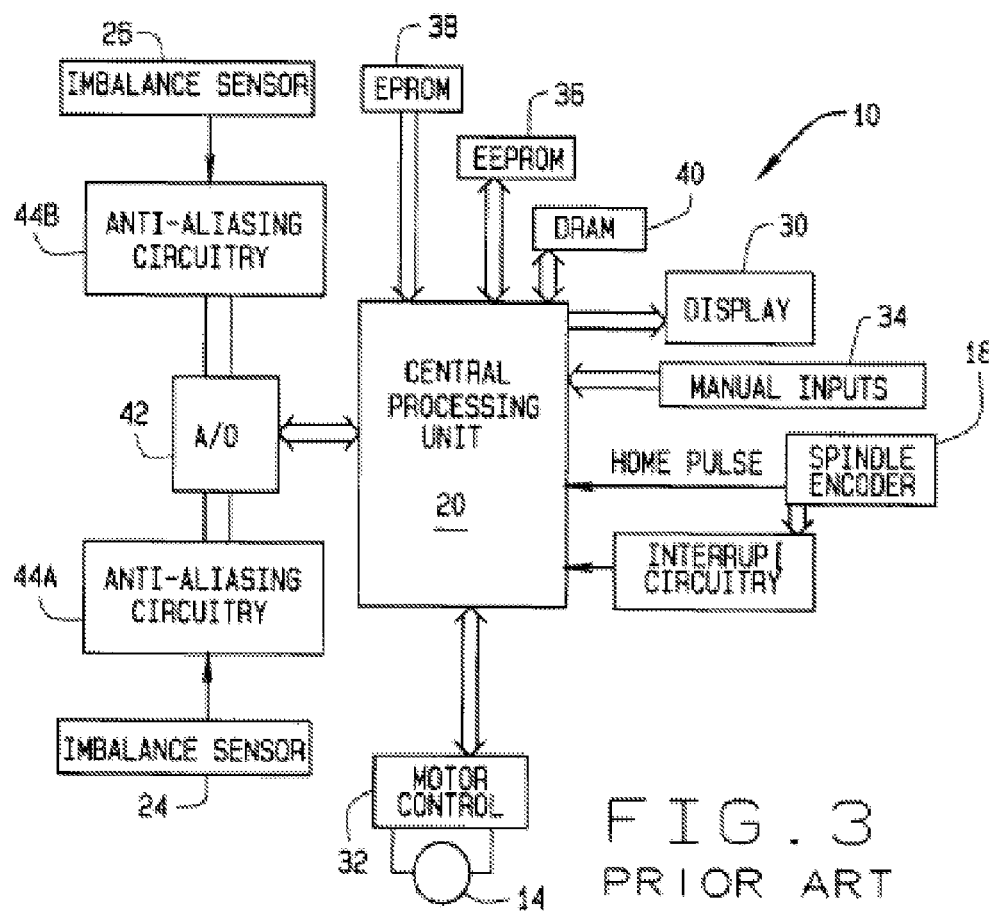
FIG. 3 PRIOR ART

METHOD AND APPARATUS FOR DETERMINING IMBALANCE CORRECTION WEIGHT AMOUNTS FOR APPLICATION DURING VEHICLE WHEEL BALANCING

CROSS-REFERENCE TO RELATED APPLICATIONS

The present application is a divisional of, and claims priority from, co-pending U.S. patent application Ser. No. 12/644,588 filed on Dec. 22, 2009 which in turn is a continuation of, and claims priority from, U.S. patent application Ser. No. 11/952,809 filed on Dec. 7, 2007, now U.S. Pat. No. 7,658,108 B2. The '809 application was a continuation of U.S. patent application Ser. No. 11/207,974 filed on Aug. 19, 2005, now U.S. Pat. No. 7,320,248. The '974 application was a continuation-in-part of U.S. patent application Ser. No. 11/127,386 filed on May 12, 2005, now U.S. Pat. No. 7,594,436. The '386 application was in turn, a continuation-in-part of U.S. patent application Ser. No. 10/648,165 filed on Aug. 26, 2003, now U.S. Pat. No. 6,952,964. The '165 application was a continuation-in-part of abandoned U.S. patent application Ser. No. 10/455,623 filed on Jun. 5, 2003. Each of the aforementioned patents and applications is herein incorporated by reference.

STATEMENT REGARDING FEDERALLY SPONSORED RESEARCH

Not Applicable.

BACKGROUND OF THE INVENTION

The present invention relates generally to automotive service equipment designed to measure imbalance in a vehicle wheel assembly, and in particular, to an improved vehicle wheel balancer system configured to identify an amount of imbalance correction weight for application to a vehicle wheel which is sufficient to reduce imbalances in the vehicle wheel below an imbalance correction threshold level.

Wheel balancer systems are designed to determine imbalance characteristics of a rotating body such as a wheel assembly consisting of a wheel rim and a pneumatic tire, or of a wheel rim alone. The determined characteristics include, but are not limited to static imbalances (i.e., "shake" forces), dynamic imbalances (i.e., couple or "shimmy" forces), lateral forces, radial forces and runout parameters. Determination of some of these characteristics result from direct measurements, while others are obtained from an analysis of the mechanical vibrations caused by rotational movement of the rotating body. The mechanical vibrations are measured as motions, forces, or pressures by means of transducers mounted in the wheel balancer system, which are configured to convert the mechanical vibrations into electrical signals.

Additionally, it is important to provide an operator with information about whether or not there is a need to correct a detected imbalance in the wheel rim or wheel assembly, or if the detected imbalance is sufficiently small so as to have a negligible effect on vehicle performance and handling, i.e., below an imbalance correction threshold level. When there is a need to correct a detected imbalance in a vehicle wheel, current vehicle wheel balancer systems are designed to calculate the size and placement positions for one or more imbalance correction weights. The imbalance correction weights are typically made from lead, which is known to have toxic effects on the environment, or from zinc, which is less toxic than lead, but which is more expensive. Those of ordinary skill of the art will recognize that other materials may also be used for imbalance correction weights.

Current vehicle wheel balancer systems are configured to calculate a sufficient amount of imbalance correction weight to reduce the detected imbalance in the vehicle wheel assembly to near zero. Wheel rim sizes on the market range from 12.0 inches in diameter up to at least 28.0 inches in diameter. It is anticipated that wheel rim sizes will increase to 30.0 inches and beyond in diameter in the future, with a corresponding increase in associated tire sizes. Due to the limited size increments in which imbalance correction weights are available, conventional vehicle wheel balancer systems are configured to display, as a zero value, any required imbalance correction weight amounts below the threshold associated with the smallest incremental weight size. Typically this weight threshold is selected to be slightly greater than the smallest standard incremental imbalance correction weight size, regardless of the size of the wheel rim or wheel assembly. Conventionally, imbalance correction weights are produced in increments of 0.25 ounces for English units, and 5.0 grams for metric units.

This can result in an operator "chasing" weights on a small or narrow wheel due to the significant effect of the threshold level on imbalances, and a poor balance on larger diameter wheels due to a reduced effectiveness of the threshold level. One solution is shown in U.S. Pat. No. 6,484,574 to Douglas, in which a balancer is configured to select the best weight plane locations from data acquired by scanning the rim profile. This is an advantageous method, but it is not economical for all balancers to have this feature.

Clearly, it would be advantageous to provide a vehicle wheel balancer system with a method for determining an imbalance threshold level at which imbalance correction is required for a vehicle wheel, and which is independent of the dimensions of the wheel assembly undergoing balancing or the incremental size of the imbalance correction weights employed, and which optionally provides an operator with a scaled visual indication of any imbalances present relative to the determined imbalance threshold level.

It would be further advantageous to provide a vehicle wheel balancer system with a method for reducing the amount of imbalance correction weight utilized to correct an imbalance measured in a vehicle wheel assembly, thereby either reducing the amount of lead weights introduced into the environment, or resulting in a corresponding cost savings through a reduction in the total applied weight amounts.

BRIEF SUMMARY OF THE INVENTION

Briefly stated, an aspect of the present invention provides methods and apparatus for reducing imbalance in a rotating body to an acceptable residual level. The apparatus is configured to carry out the method, which includes the step of comparing a measured imbalance in the rotating body to an imbalance correction threshold. If the measured imbalance exceeds the imbalance correction threshold, a placement location and an amount of imbalance correction weight sufficient to reduce the imbalance in the rotating body to an acceptable residual level which is below the imbalance correction threshold, utilizing a residual imbalance goal greater than zero, is determined for application to the rotating body.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a diagrammatic view illustrating a generic wheel balancer suitable for use with the present invention;

FIG. 2 is a simplified top plan view illustrating an alternate generic wheel balancer suitable for use with the present invention;

FIG. 3 is a block diagram illustrating various parts of a generic wheel balancer of FIG. 1 or FIG. 2;

Corresponding reference numerals indicate corresponding parts throughout the several figures of the drawings.

DESCRIPTION OF THE PREFERRED EMBODIMENT

Figure 4:
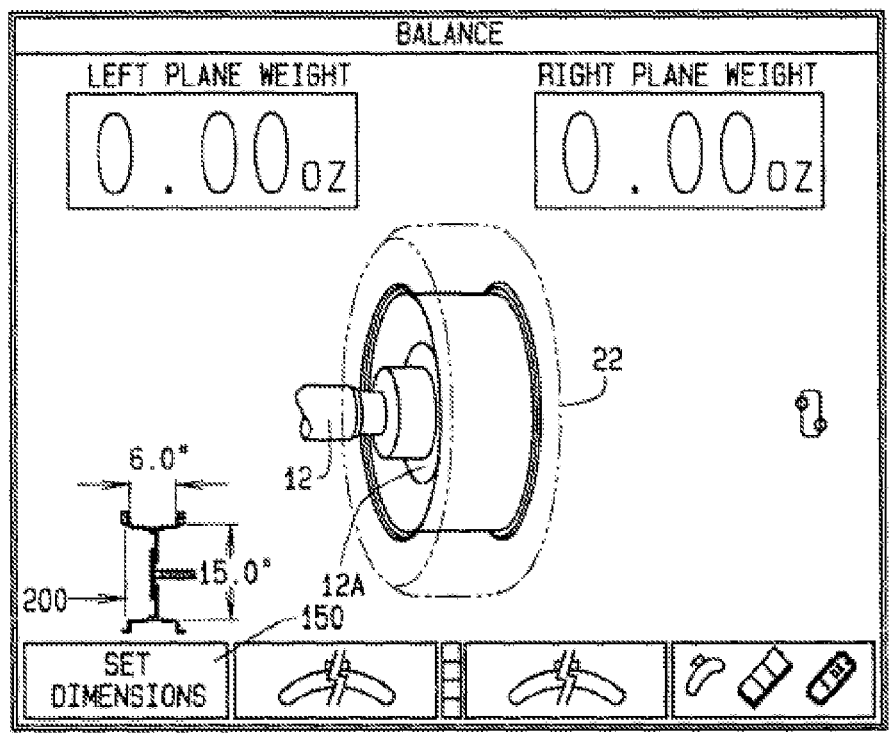
FIG. 4 is a representation of a prior art balancer display indicating that no imbalance correction weights are required to correct an imbalance present in a rotating body having the illustrated dimensions.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Turning to the drawings, FIGS. 1 and 2 illustrate, in simplified form, the mechanical aspects of a wheel balancer 10 suitable for the present invention. The particular balancer shown is illustrative only, since one of ordinary skill in the art in the balancer field will recognize that the particular devices and structures used to obtain dimensional and imbalance information related to a rotating body may be readily changed without changing the present invention.

Balancer 10 includes a rotatable shaft or spindle 12 driven by a suitable drive mechanism such as a motor 14 and drive belt 16. Mounted on spindle 12 is a conventional optical shaft encoder 18 which provides speed and rotational position information to a central processing unit 20, shown in FIG. 3. The actual construction of the mechanical aspects of the balancer 10 can take a variety of forms. For example, the spindle 12 can include a hub 12A against which the rotating body 22 abuts during the balancing procedure.

During the operation of wheel balancing, at the end of the spindle 12, a rotating body 22 under test is removably mounted for rotation with the spindle hub 12A. The rotating body 22 may comprise a wheel rim, or a wheel assembly consisting of a wheel rim and a tire mounted thereon. To determine the rotating body imbalance, the balancer includes at least a pair of imbalance force sensors 24 and 26, such as piezoelectric sensors or strain gauges, coupled to the spindle 12 and mounted on the balancer base 28.

When a rotating body 22 is unbalanced, it vibrates in a periodic manner as it is rotated, and these vibrations are transmitted to the spindle 12. The imbalance sensors 22 and 24 are responsive to these vibrations in the spindle 12, and generate a pair of analog electrical signals corresponding to the phase and magnitude of the vibrations at the particular sensor locations. These analog signals are input to circuitry, described below, which determines the required magnitudes and positions of correction weights necessary to correct the imbalance.

Turning to FIG. 3, wheel balancer 10 includes not only the imbalance sensors 22 and 24, and spindle encoder 18, but also the central processing unit 20 (such as a microprocessor, digital signal processor, or graphics signal processor). The central processing unit 23 performs signal processing on the output signals from the imbalance sensors 22 and 24 to determine an imbalance in the rotating body. In addition, the central processing unit 20 is connected to and controls a display 30 which provides information to an operator, control motor 14 through associated motor control circuits 32, and keeps track of the spindle rotation position with encoder 18.

Balancer 11 further includes one or more manual inputs 34, such as a keyboard, control knobs, or selector switches, which are connected to the central processing unit 20. The central processing unit 20 has sufficient capacity to control, via software, all the operations of the balancer 10 in addition to controlling the display 30. The central processing unit 20 is connected to a memory such as an EEPROM memory 36, EPROM program memory 38, and a dynamic RAM (DRAM) memory 40. The EEPROM memory 36 is used to store non-volatile information, such as calibration data, while the central processing unit 20 uses the DRAM 40 for storing temporary data.

The central processing unit 20 is also connected to an analog-to-digital converter 42. The signals from the imbalance sensors 22 and 24 are supplied through anti-aliasing circuitry 44A and 44B (if needed) to the analog-to-digital converter 42.

The operation of the various components described above is fully set forth in U.S. Pat. No. 5,396,436 to Parker et al., the disclosure of which is incorporated herein by reference. It should be understood that the above description is included for completeness only, and that various other circuits could be used instead.

Once a rotating body 22 is accurately centered on the balancer spindle 12, the balancer 10 can begin the process of measuring one or more imbalance parameters of the rotating body 22, and providing the operator with one or more suggested imbalance correction weight magnitudes and placement locations. Imbalance correction weight magnitudes and placement locations are calculated and displayed to an operator on a screen or numerical readout 30.

Due to the limited size increments in which imbalance correction weights are usually available, conventional balancer systems are configured to display to the operator a zero correction weight value for any imbalances which would require the installation of an imbalance correction weight amount which is below an amount which is set at or near the smallest incremental correction weight amount.

For a balancer system adapted to use imbalance correction weights having 0.25 oz. increments, an exemplary limit is 0.29 oz. Unfortunately, this can result in an operator "chasing" weights on a small or narrow wheel due to the insignificant effect of the correction weight on imbalances, and a poor balance on today's larger diameter wheels.

Figure 5:
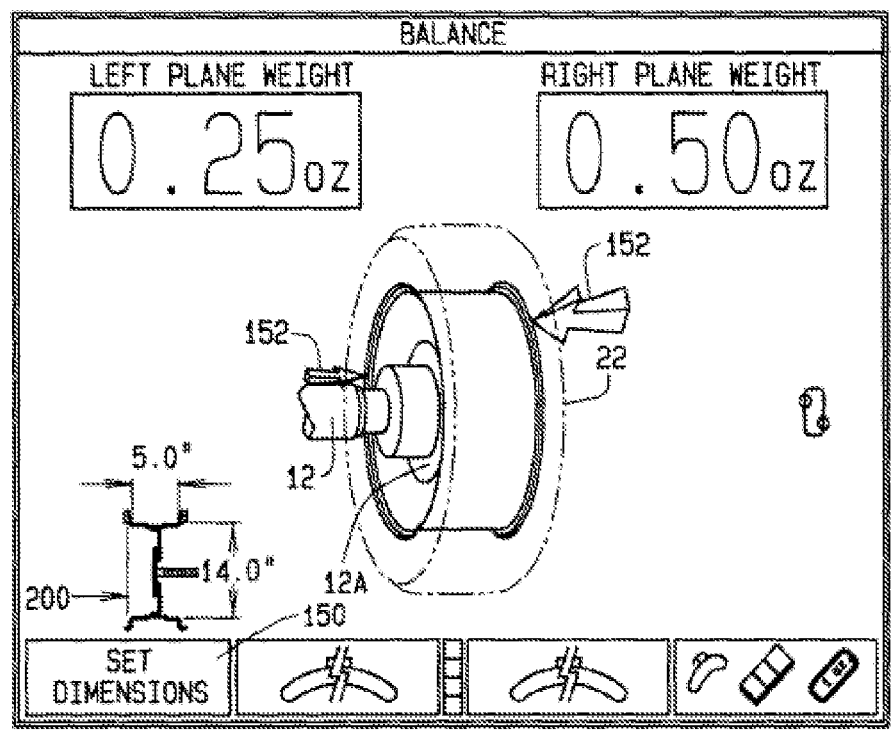
FIG. 5 is a representation of a prior art balancer display indicating imbalance correction weight amounts required to correct the same imbalance as in FIG. 4 in a rotating body having smaller dimensions.

For example, as shown in FIG. 4, a wheel having a 6.0 inch axial width, and a 15.0 inch diameter might have an imbalance which would require the application of an amount of imbalance correction weight below the imbalance correction weight amount threshold. As a result, the balancer indicates that no imbalance correction weights are required for either the left or right imbalance correction planes. However, as shown in FIG. 5, if the dimensions of the wheel are changed, such as by the operator using the "SET DIMENSIONS" button 150, to indicate a 5.0 inch axial width and a 14.0 inch diameter, without re-measuring the wheel imbalance, greater weight amounts are required to correct the same imbalance. If these weight amounts exceed the imbalance correction weight amount threshold, a conventional balancer directs an operator to install sufficient imbalance corrections weights in the left and right imbalance correction planes (as indicated by arrows 152) to reduce or eliminate the imbalance, despite the fact that the amount of the imbalance is unchanged from that considered "acceptable" in a rotating body having larger dimensions.

Figure 6:
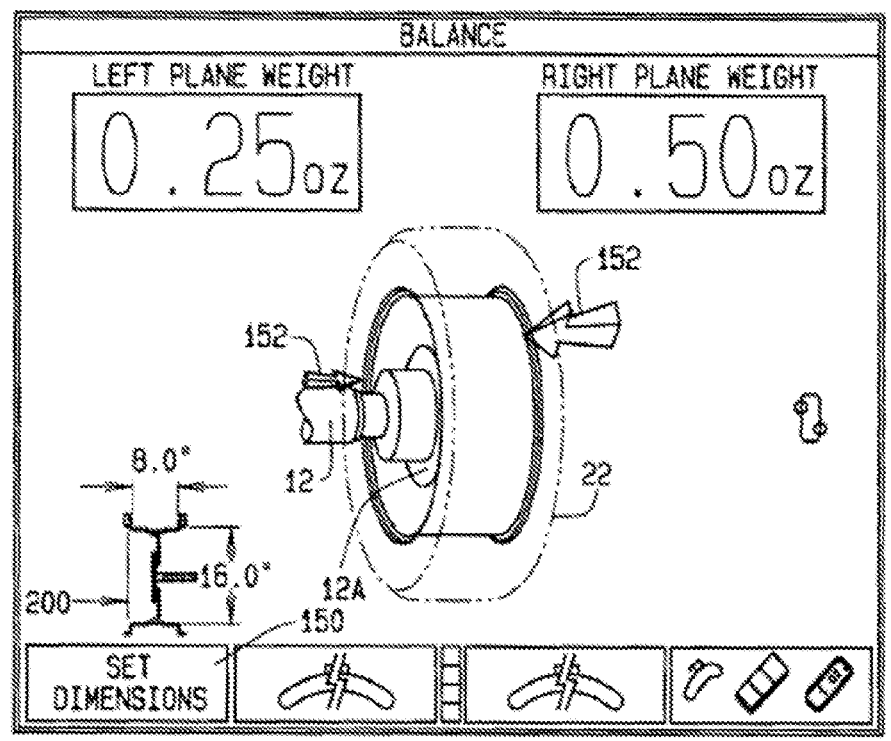
FIG. 6 is a representation of a prior art balancer display indicating required weight placement locations and amounts required to correct an imbalance in a rotating body of specific dimensions.
Figure 7:
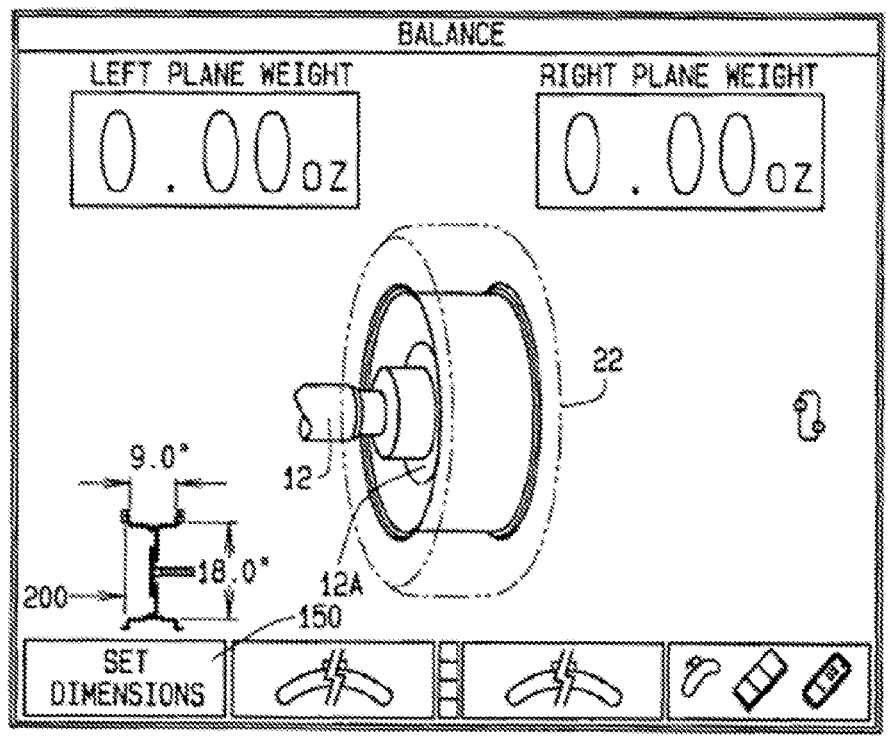
FIG. 7 is a representation of a prior art balancer display similar to FIG. 6, indicating that no imbalance correction weights are required to correct the same imbalance as in FIG. 6 in a rotating body with larger dimensions.

An opposite and more serious problem exists for conventional balancer systems when balancing large wheels. For example, as shown in FIG. 6, a wheel having an 8.0 inch axial width, and a 16.0 inch diameter might have an imbalance above the imbalance correction weight threshold, resulting in the balancer indicating that imbalance correction weights are required for both the left or right imbalance correction planes. However, as shown in FIG. 7, if the dimensions of the wheel are changed, such as manually by the operator using button 150, to show an 18.0 inch diameter, without re-measuring the wheel imbalance, less weight is required to correct the same imbalance, which drops below the weight threshold level. As a result, a conventional balancer now indicates that no weights in the left and right imbalance correction planes are required, despite the fact that the amount of the imbalance is unchanged from that considered "unacceptable" in a rotating body having smaller dimensions.

Figure 8A:
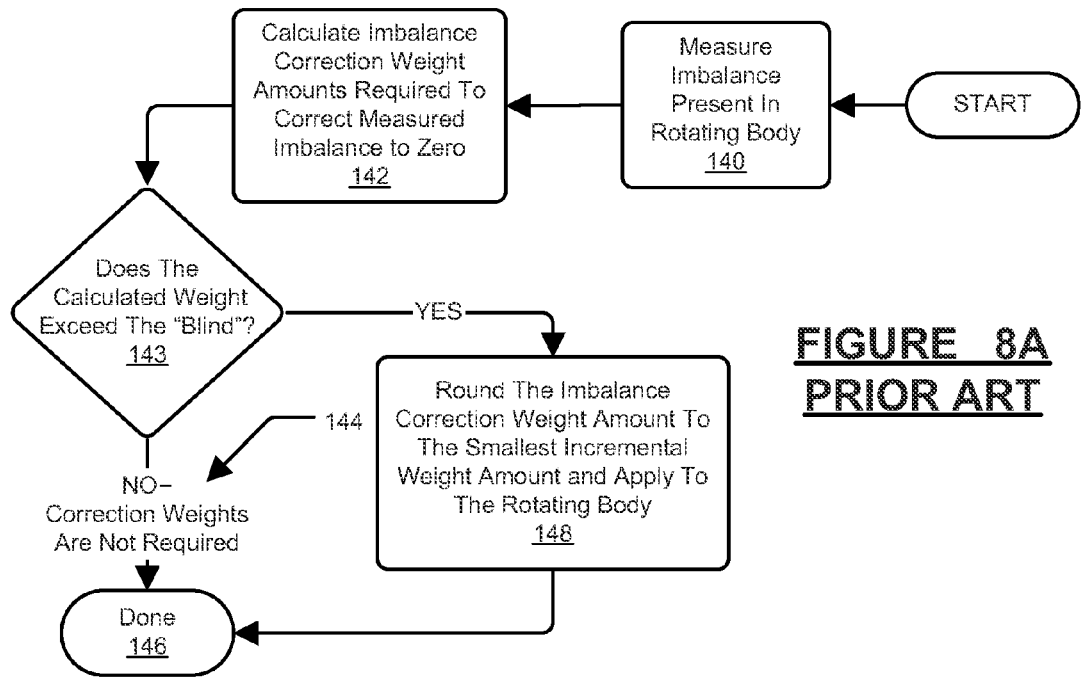
FIG. 8A is a flow chart diagram of a prior art method for determining required imbalance correction weights limited only by an imbalance correction weight threshold level.

As shown in FIG. 8A, to minimize the amount of imbalance in a rotating body, conventional balancer systems initially measure the imbalances present in the rotating body (Box 140). Each imbalance may be expressed as a vector having a magnitude and a phase, or as weight amount and placement location. Imbalance correction weight amounts and placement locations required to reduce the imbalance magnitudes to zero are determined (Box 142). The determined imbalance correction weight amounts are compared with the "blind" or imbalance correction weight threshold for the rotating body (Box 143). If the imbalance correction weight amounts are below the "blind" or acceptable imbalance correction weight thresholds, as indicated at 144, no imbalance correction weight applications are required for the rotating body, and the process is completed (Box 146). If however, the imbalance correction weight amounts exceed the acceptable imbalance correction weight thresholds, the imbalance correction weight amounts are rounded to the smallest incremental weight amount available, and applied to the rotating body (Box 148).

Figure 8B:
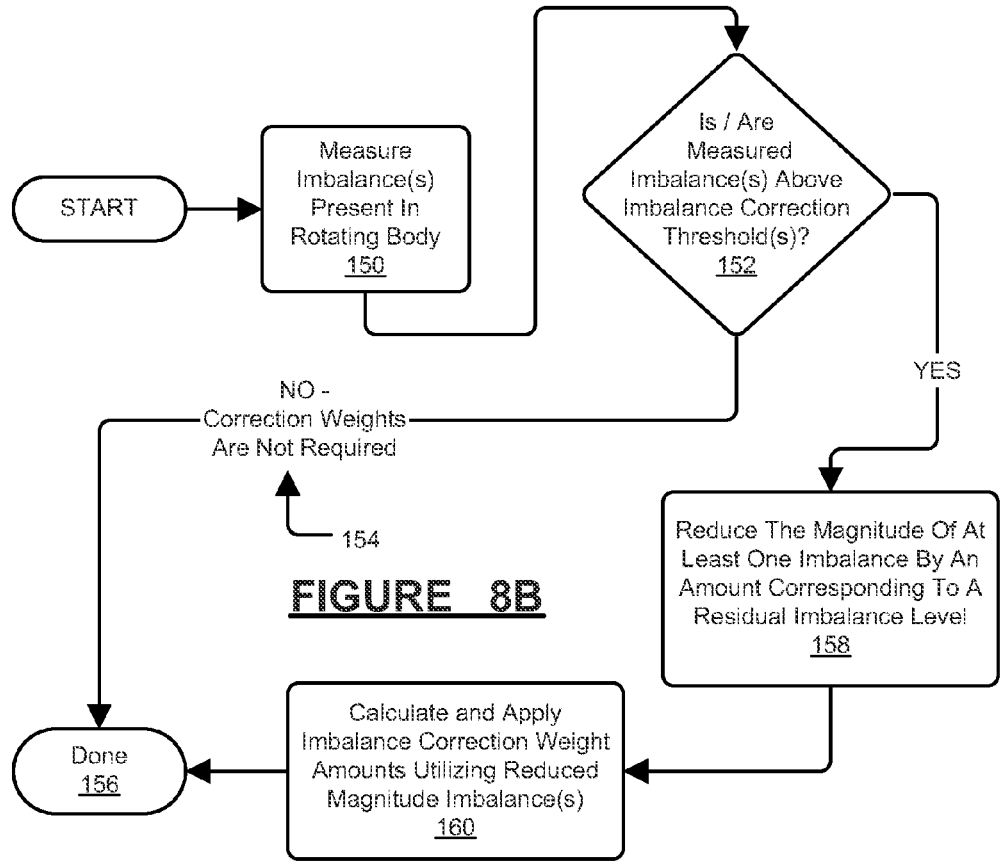
FIG. 8B is a flow chart diagram of a method of the present invention for determining a reduced amount of imbalance correction weights.

In contrast, a method of the present invention as illustrated in FIG. 8B seeks to reduce the amount of imbalance present in a rotating body to an acceptable level (a residual imbalance goal) with the application of a reduced amount of imbalance correction weight, and does not attempt to minimize the residual imbalance present in the rotating body. An initial measurement of each imbalance present in the rotating body (Box 150) is acquired. Each imbalance may be expressed as a vector having a magnitude and a phase. The measured imbalances are compared with acceptable thresholds for the rotating body (Box 152).

If the measured imbalances (such as static and couple forces) are below the imbalance correction thresholds, as indicated at 154, no imbalance correction weight applications are required for the rotating body, and the process is completed (Box 156). If however, the measured imbalances exceed the imbalance correction thresholds, a sufficient amount of imbalance correction weight is calculated for application to the rotating body to reduce the imbalance of the rotating body to within a tolerance of a residual imbalance level. Preferably, the magnitude of a component portion of each measured imbalance is reduced by an amount corresponding to a residual imbalance level (Box 158), and imbalance correction weight amounts are then calculated and applied to the rotating body to correct the reduced the imbalance in the rotating body (Box 160). Alternatively, the magnitudes of the component portions of each measured imbalance may be calculated by other known mathematical methods, such as iterative approaches, to leave the desired residual imbalance in the rotating body after imbalance correction weight application.

Figure 8C:
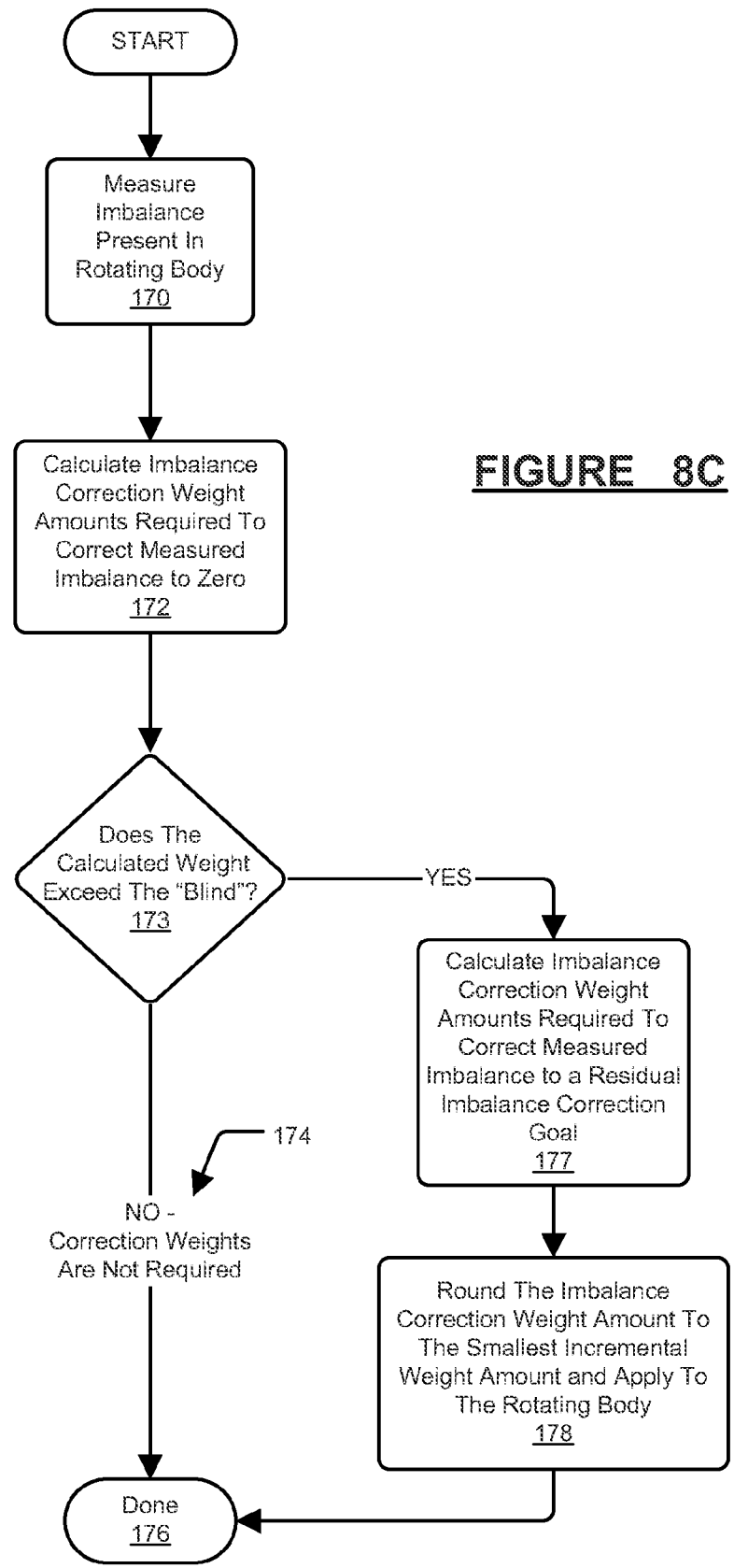
FIG. 8C is a flow chart diagram of an alternate method of the present invention.

In general terms, as shown in FIG. 8C, the a balancer system of the present invention will initially measure the imbalances present in the rotating body (Box 170). Each imbalance may be expressed as a vector having a magnitude and a phase, or as weight amount and placement location. Imbalance correction weight amounts and placement locations required to reduce the imbalance magnitudes to zero are determined (Box 172). The determined imbalance correction weight amounts are compared with the "blind" or imbalance correction weight threshold for the rotating body (Box 173). If the imbalance correction weight amounts are below the "blind" or acceptable imbalance correction weight thresholds, as indicated at 174, no imbalance correction weight applications are required for the rotating body, and the process is completed (Box 176). If however, the imbalance correction weight amounts exceed the acceptable imbalance correction weight thresholds, imbalance correction weight amounts and placement locations required to reduce the imbalance magnitudes to a residual imbalance correction goal are determined (Box 177). Finally, the determined imbalance correction weight amounts are rounded to the smallest incremental weight amount available, and applied to the rotating body (Box 178).

It is to be noted that alternate approaches can be employed to bring down the imbalance or imbalance components of the rotating body to a non-zero residual imbalance goal without departing from the scope of the invention. For example the rotating body can be associated with an energy and or energies of at least a component due to imbalance (such as static or couple), where at least one weight is computed and applied to leave a desired residual level of energy (or component energy such as static or couple).

The application of the imbalance correction weight amounts determined using the methods of the present invention is intended to leave a residual imbalance in the rotating body which is equal to, or below, the imbalance correction threshold for that component portion of the imbalance, but which is not minimized. In essence, the method of the present invention intentionally leaves a residual imbalance which is greater than that left by conventional balancer systems, but which is below the associated acceptable threshold. In general, the amount of imbalance correction weights to be applied to the rotating body may be calculated by any of a variety of known mathematical methods, such as vector mathematics or iterative techniques, to leave a desired residual imbalance in the rotating body after application of the imbalance correction weights.

Figure 9:
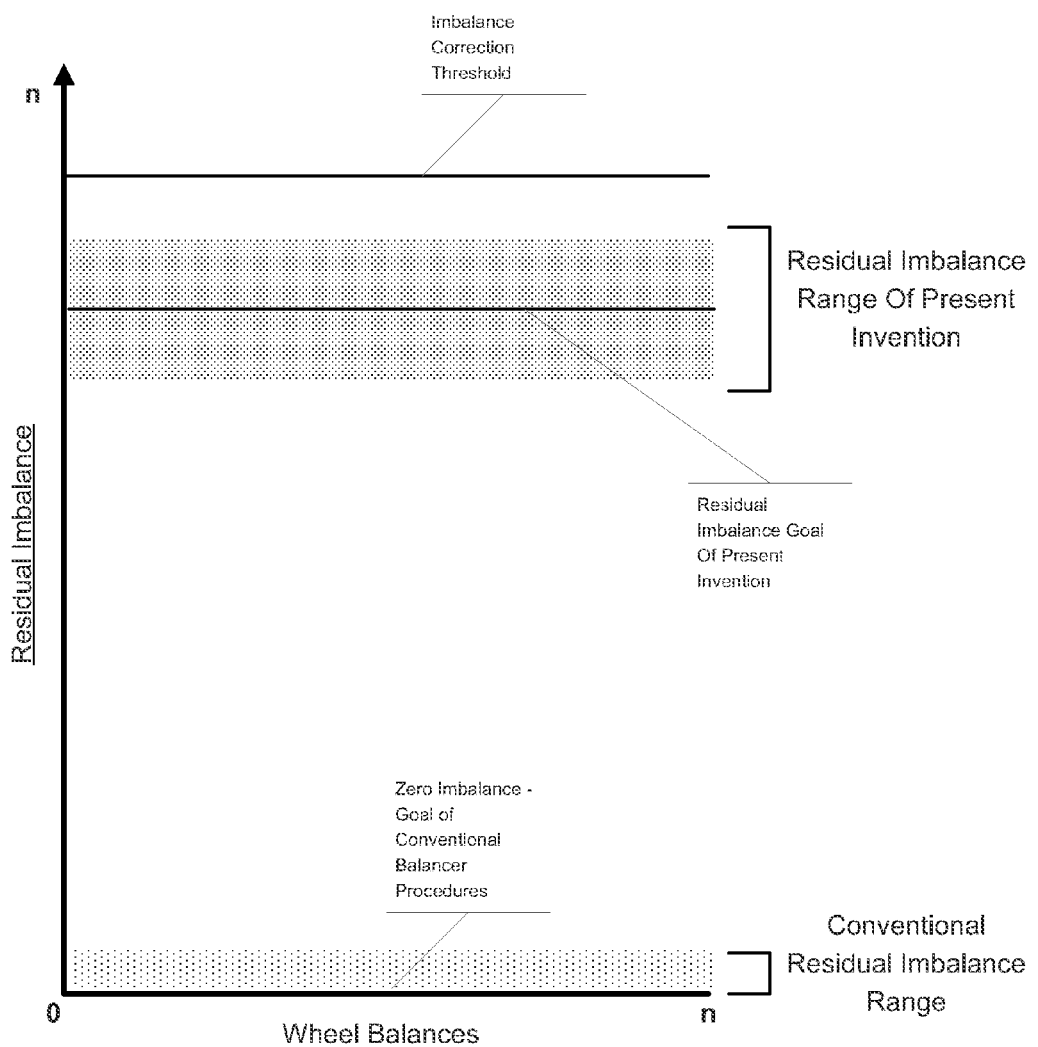
FIG. 9 is a graphical illustration of the difference in residual imbalance ranges in rotating bodies after imbalance correction between methods of the present invention and conventional imbalance correction methods.

As best shown in FIG. 9, those of ordinary skill in the art will recognize that placement error, weight amount errors, machine noise, and rounding of the imbalance correction weight amounts to the smallest available incremental weight size will result in residual imbalances in the rotating body may not exactly match a residual imbalance goal which is not zero, but which will be within a known tolerance about that non-zero goal. The tolerance is typically defined by the rounding up or down of the calculated weight amount to accommodate the smallest incremental weight amount available to an operator. FIG. 9 further illustrates a difference in the results achieved by the present invention when compared with conventional balancing methods. Imbalanced rotating bodies, such as vehicle wheels, which have been corrected using convention balancing methods will have a range of expected residual imbalances which are equal to, or slightly above zero. In contrast, imbalanced rotating bodies which have been corrected using the methods of the present invention will have an expected range or tolerance of residual imbalances which range from slightly above to slightly below the non-zero residual imbalance goal.

By leaving a greater residual imbalance in the rotating body, the methods and apparatus of the present invention require a smaller amount of imbalance correction weights to be applied to the rotating body to achieve an acceptable level of imbalance reduction, thus resulting in savings in terms of both time and cost. For example, using actual imbalance measurement data acquired from approximately 7500 different vehicle wheels, it was found that conventional vehicle wheel balancing procedures required approximately 16,500 oz. of imbalance correction weights to correct the measured imbalances. Applying the methods of the present invention to the same imbalance measurements, approximately 13,250 oz. of imbalance correction weights would have been utilized, which would have resulted in an average imbalance correction weight amount savings of 20%.

The average amount of imbalance correction weight saved for each vehicle wheel varies depending upon the type of imbalance correction weights being utilized and their associated placement locations about the vehicle wheel assembly. For example, it has been observed that an average savings approaching 30% can be achieved when using the methods of the present invention with one or more adhesive-type imbalance correction weights. Not only is the weight cost savings readily more apparent using adhesive weights but the labor and confusion is reduced as well. For example the invention has been shown to reduce the need for two strips adhesive weights (e.g. when over 3.0 oz. is required) of at a weight location to just one strip.

It will be appreciated that information about the amount of imbalance correction weight saved when using the methods of the present invention for the imbalance correction of a rotating body, such as a vehicle wheel, may be useful to an operator. Accordingly, it will recognized that the methods of the present invention may be adapted to store information that is or can be used to determine the amount of imbalance correction weight saved when compared against the amount of imbalance correction weights which would have been applied had one or more conventional imbalance correction procedures been utilized to reduce a measured imbalance to at or near zero. This information may be stored for later retrieval and analysis, and/or it may be displayed to the operator during the imbalance correction procedure.

In an alternate embodiment of the present invention, the balancer 10 is provided with a reference value representative of the maximum imbalance effect which is permitted for each type of imbalance in the rotating body 22 to be corrected, i.e., $F_{max}$ for static imbalance and $M_{max}$ for dynamic imbalance. For example, the static imbalance force limit $F_{max}$ is provided to identify a static imbalance threshold, and a dynamic imbalance moment limit $M_{max}$ is provided to identify a dynamic imbalance threshold, selected to correspond to levels of imbalance forces in the rotating body 22 which are imperceptible to the average consumer. For example, 2.18 oz.-in. for a static imbalance moment limit, corresponding to a 0.29 oz. weight on a 15" diameter wheel rim, and 15.0 oz.-in$^2$. for a dynamic imbalance limit which corresponds to approximately a 0.33 oz. weight on each plane of 6" wide, 15" diameter wheel rim, each separate by 180 degrees.

It may be desirable, however, to adjust these limits to favor either static imbalance or dynamic (couple) imbalance. For instance, it is understood that passengers in a vehicle are less sensitive to a dynamic (couple) imbalance than a static imbalance. The values for $F_{max}$ and $M_{max}$ may be programmed into the balancer 10 or selected as a function of the particular class of vehicle undergoing service (i.e. passenger vehicle, sport utility vehicle, light truck), as a function of the type of tire being balanced, or based upon a database of specific vehicle types and tire combinations. Vehicles with lower sensitivity to imbalance forces can tolerate a greater imbalance level in the tire assemblies without perception by the average consumer. For example, a way to reduce imbalance correction labor with a minimal increase in vibration would be to increase the dynamic limit $M_{max}$ to 20.0 oz.-in.$^2$ for some types of rotating bodies 22.

Preferably, the calculated imbalance correction weight amounts are sufficient to reduce the residual imbalance in the rotating body to a residual imbalance level, or imbalance tolerance level, which is approximately 90% of the acceptable imbalance thresholds, in contrast to prior art balancer systems which seek to minimize the residual imbalance forces in the rotating body to a value at or near zero, limited only by rounding the applied imbalance correction weight amounts to the smallest incremental weight amount available for application to the rotating body. The residual imbalance level or tolerance may be a function of the acceptable imbalance threshold (i.e. a percentage thereof), a fixed value, a user selectable value, or selected using a database of vehicle information. By selecting a permissible residual imbalance level or tolerance in the rotating body which is below the acceptable imbalance thresholds, but which is greater than the zero, the amount of correction weight which must be utilized to bring the imbalance present in the rotating body to the acceptable level is reduced, resulting in cost savings.

For prior art balancer systems which calculate an imbalance correction weight amount necessary to reduce a measured imbalance to zero, an alternate method of the present invention to reduce the applied amount of imbalance correction weight requires calculating and applying a reduced imbalance correction weight amount which is less than the amount of the originally calculated imbalance correction weight amount which would have been applied to correct the measured imbalance to near zero, thereby leaving an intentional residual imbalance in the rotating body. After application of the reduced imbalance correction weight amount to the rotating body, one or more repetitions of the imbalance measurement and correction weight calculation process may be required to ensure that the imbalances present in the rotating body have been reduced to an acceptable residual imbalance level below the imbalance correction threshold.

Figure 10:
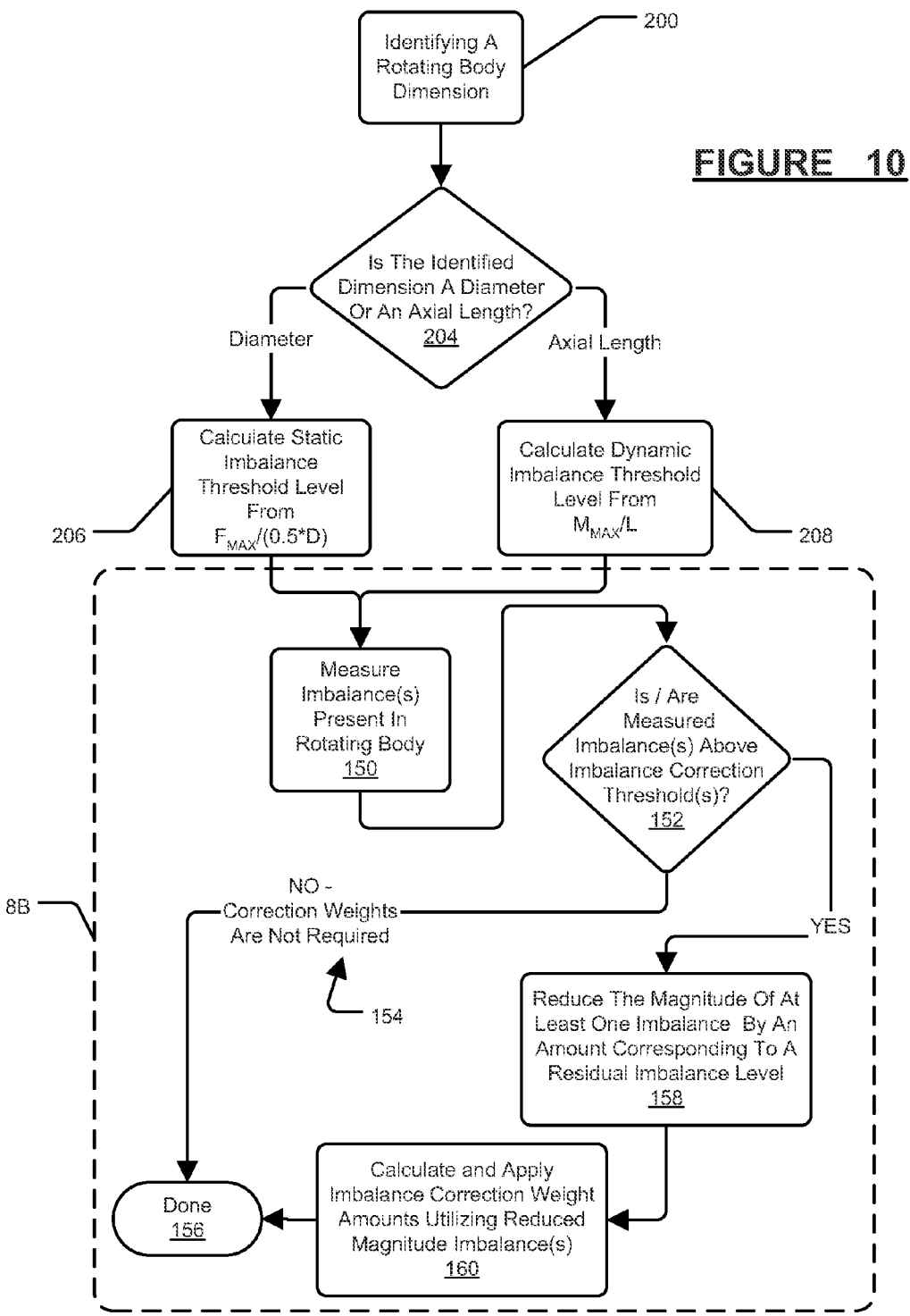
FIG. 10 is a flow chart diagram of the method of the present invention shown in FIG. 8B utilized with calculated imbalance threshold levels.

It will be recognized that the various methods of the present invention may be utilized with a wide variety of balancer systems, including those which utilize fixed imbalance threshold levels, as well as balancer systems which calculate imbalance threshold levels based upon dimensions of the rotating body, such as shown in FIG. 10.

As shown in FIG. 10, a balancer 10 is configured to select an imbalance correction weight threshold or "blind" based upon one or more dimensions of the rotating body 22 being balanced. These dimensions include the imbalance correction weight placement diameter and an imbalance correction weight placement separation distance. Preferably, these dimensions are measured directly by the balancer 10, such as by utilizing operator assistance to place a wheel dimension measurement device at the desired imbalance correction weight planes and/or at the edge of the rotating body 22, or by non-contact measurement means. Alternatively, when the diameter and width of a rotating body 22 are known, an operator can directly supply the balancer 10 with corresponding values using one or more manual inputs 34 (Box 200).

The balancer 10 is configured to utilize the value representative of the maximum imbalance effect permitted, together with the associated dimensions of the rotating body 22 to identify a variable imbalance correction threshold used to display, to an operator on display 30, as zero any imbalance which would require an imbalance correction weight value below the variable threshold. (Box 204).

For correcting static imbalances present in the rotating body 22 (Box 206), the static imbalance force limit is $F_{max}$ (typically in units of oz.-in.), the known or measured rotating body diameter is D, and the imbalance correction weight threshold or "blind" is $W_{BS}$. A variable threshold value for $W_{BS}$ is determined by the balancer 10 according to the following equation:

$$W_{BS}=F_{MAX}/(D/2) \hspace{2cm} \text{Equation (1)}$$

For correcting dynamic imbalances present in the rotating body 22 (Box 208), the dynamic imbalance moment limit is $M_{max}$, (typically in units of oz.-in.$^2$) the known or measured rotating body axial length or axial width is W, and the imbalance correction weight threshold or "blind" is $W_{BD}$. If it is assumed that there is no static imbalance in the wheel, a variable threshold value for $W_{BD}$ is determined by the balancer 10 according to the following equation:

$$W_{BD}=M_{max}/W*(D/2) \hspace{2cm} \text{Equation (2)}$$

For example, if the balancer 10 is configured with a static imbalance force limit ($F_{max}$) of 2.18 oz.-in. for correcting static imbalances present in the rotating body 22, and the rotating body 22 has a measured or known diameter of 15.0", solving Equation (1) above for $W_{BS}$ yields an imbalance correction weight threshold or "blind" of 0.29 oz. If the rotating body 22 has a measured or known diameter of 12.0", Equation (1) yields an imbalance correction weight threshold or "blind" of 0.36 oz. Correspondingly, if the rotating body 22 has a measured or known diameter of 20.0", Equation (1) yields an imbalance correction threshold or "blind" of 0.21 oz. for the same value of $F_{max}$.

The benefit offered by a balancer 10 configured to utilize the aforementioned methods to identify imbalance correction thresholds based in-part upon the known or measured dimensions of a rotating body 22 undergoing balancing can be clearly illustrated by the following comparisons.

When balancing a wheel assembly having a 15.0" diameter wheel rim with an axial width of 5.0", it is possible for a conventionally configured balancer to identify a static imbalance over the limit of 2.18 oz.-in. but a dynamic imbalance under the limit of 15.0 oz.-in.$^2$ and suggest a correction requiring two imbalance correction weights of 0.25 oz. and 0.75 oz., one to be placed on the inner lip of the wheel rim, and the other to be placed on the outer lip of the wheel rim. However, on a balancer 10 configured with a dynamic imbalance moment limit ($M_{max}$) of 15.0 oz.in$^2$, the dynamic imbalance is determined to have minimal effect on the vehicle and will be ignored and the remaining static imbalance can be corrected by a single 0.25 oz. weight.

By setting the imbalance threshold amounts based on the actual force and moment values, rather than displayed weight amounts, it is possible to minimize the residual imbalance in a wheel. A conventional balancer may measure a purely static imbalance that requires 0.50 oz. weight to correct. If the balancer is set to the "Dynamic" balance mode it will calculate that a 0.25 oz. weight is required on both the left and the right planes. Since the traditional threshold is set to 0.29 oz. the machine will show that no correction weights are required, but the wheel is not balanced. With the method of the present invention employed, a reduced correction weight amount will be displayed and the wheel will be balanced within the acceptable imbalance thresholds. In the example described above, there is a small amount of couple imbalance present along with the static imbalance. Even though the amount of couple is small and no specific weights are required to correct it, it is possible to place the static correction weight in a location to possibly reduce the couple imbalance.

When correcting the static imbalance, the single static weight can be placed on either the inner plane, adjacent the balancer, or the outer plane, opposite the balancer. The inner plane is alternatively referred to as the left plane, when the wheel is mounted on the right side of a balancer, and the outer plane is alternatively referred to as the right plane for the same wheel placement. To choose the correct plane in which to place the single static weight, it is necessary to compare the phase of the dynamic imbalance vector to the phase of the static force vector. The static correction weight is placed on the plane that minimizes the residual dynamic imbalance, without the placement of additional couple imbalance correction weights.

This will correct the static imbalance (which was greater than the blind), and depending upon the difference between the couple and static imbalance phase, it will decrease the couple imbalance or leave it unchanged (couple imbalance was already acceptably low). Since the inner and outer plane couple imbalance phases are always 180 degrees apart, the static imbalance phase will never be more than 90 degrees away from one of the couple imbalance phases. If the difference between the static and one of the couple imbalance phases is small, there will be a significant improvement in couple imbalance. If the static imbalance phase is exactly 90 degrees between both couple imbalance phases, the couple imbalance will not change when the static correction weight is added. This can be accomplished by the following logic sequence:

Assume the balancer is in "Dynamic" mode, static imbalance is greater than blind, and couple imbalance is less than the blind. The following steps are taken to place a single weight that will correct the static imbalance while reducing (or not changing) the couple imbalance.

Let couple imbalance=0 and calculate the static correction weight.

Static weight magnitude=Static imbalance/radius

Static weight phase=Static imbalance phase+180 degrees.

To correct the static imbalance, this weight could be placed on either the inner plane or the outer plane.

If the difference between the static imbalance phase angle and the outer plane couple imbalance phase angle is less than 90 degrees, place the single static correction weight on the outer plane. Otherwise, place the weight on the inner plane.

If the balancer is in "Static" mode it is common that dimensions will only be entered for a single plane. With the present invention it is desirable to compare the dynamic imbalance to the dynamic threshold. If the dynamic imbalance exceeds the threshold it is desirable to provide an indicator to the operator of this condition. The indication may be in the form of blinking lights, alpha-numeric text, or in the form of a message. If the operator has entered dimensions for two planes the indicator may be in the form of a display of the weights required to correct the couple imbalance.

Figure 11:
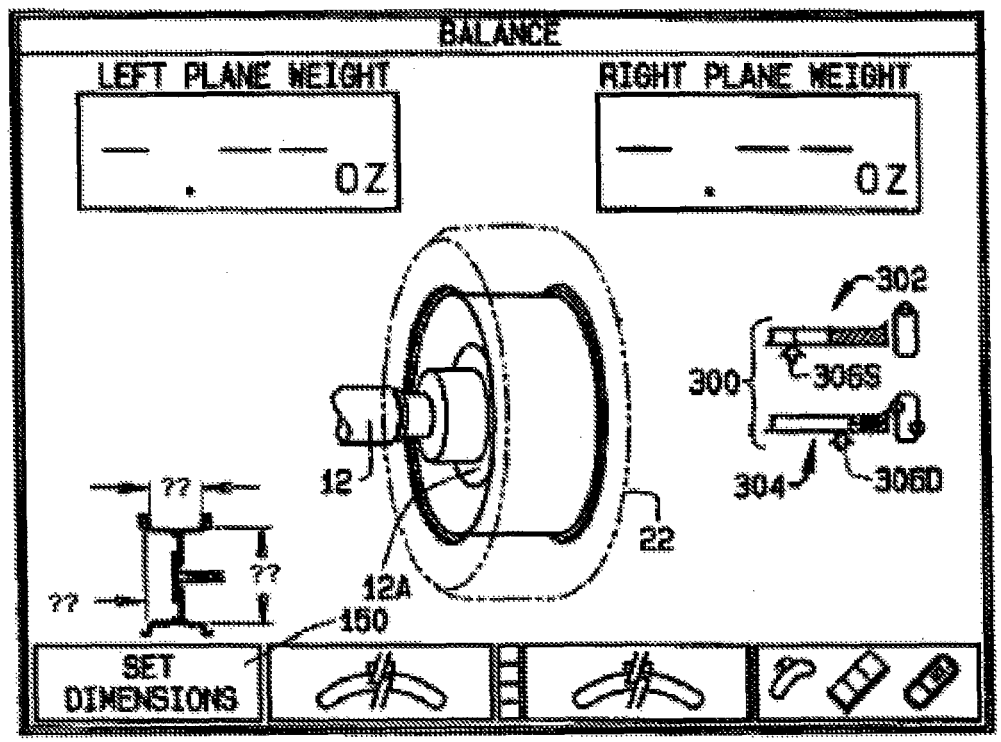
FIG. 11 is a representation of a display of the present invention showing a graphical presentation of the imbalance forces in the rotating body of unknown dimensions.
Figure 12:
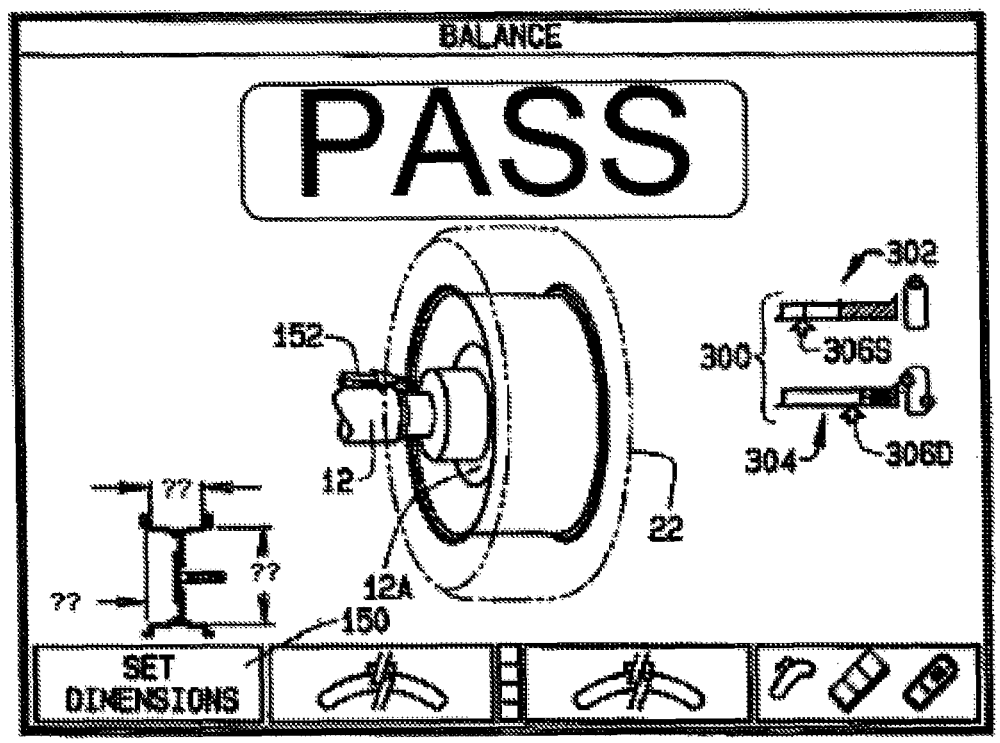
FIG. 12 is a representation of a display similar to FIG. 9, indicating a pass condition for a rotating body of unknown dimensions.

A balancer 10 of the present invention may be configured to acquire initial vector measurements of the static and couple imbalances of a rotating body 22, represented as S> and C>, prior to utilizing dimensional measurements of the rotating body 22 (i.e., such as a rotating body or vehicle wheel of unknown dimensions). The specific dimensional measurements of the rotating body, and the dimensional locations at which to place imbalance correction weights, are not utilized in an initial evaluation of the imbalance forces on the rotating body 22. The measured values for S> and C> are compared to reference imbalance component limits $F_{max}$ and $M_{max}$ to determine if the additional steps associated with the determination and placement of imbalance correction weights are required. If the imbalance forces present in the rotating body 22 are below the reference thresholds, they may optionally be displayed in a graphical representation, as shown in FIG. 11, and require no further corrective action, which may be indicated as a "passed" condition for the rotating body 22, such as shown in FIG. 12.

If the measured imbalance forces exceed the reference thresholds, the operator may be directed to proceed to a dimensional measurement step, after which the reduced imbalance correction weight amounts and applications locations are calculated and displayed according the method of the present invention, but without the use of a conventional "blind" setting.

Alternatively, the vehicle wheel balancer 10 may be configured to compute imbalance correction weight amounts and placement locations for a rotating body 22 of unknown dimensions utilizing a set of reference dimensions, such as a 15.0 in. diameter and a 6.0 in. width, together with the measured imbalance forces present in the rotating body 22. The computed imbalance correction weight amounts are then compared by the balancer 10 with reference weight amounts associated with a rotating body having the reference dimensions, and a determination of acceptance based there on. For example, if the computed imbalance correction weight amounts are less than the reference weight amounts, the balancer 10 may be configured to indicate the rotating body has "passed", and does not require any imbalance corrective action. Conversely, if the computed imbalance correction weight amounts exceed the reference weight amounts, the balancer 10 is configured to calculate reduced corrective imbalance correction weight amounts and placement locations utilizing actual dimensions of the rotating body 22 undergoing balance testing according to the method of the present invention.

The ability of a vehicle wheel balancer system 10 to evaluate the imbalance forces and/or imbalance correction weight amounts associated with a rotating body prior to a determination or measurement of the actual dimensions of the rotating body 22 provides an operator with a potentially significant time savings during a balancing operation. This may be useful for a variety of vehicle wheel balancer systems, including those employing non-contact wheel measurement systems such as ultrasonic measurement systems, laser-based measurement systems, or, machine vision measurement systems, which require a considerable amount of time to acquire the wheel dimensional measurements relative to the amount of time required to determine the imbalance forces present in the wheel.

An alternate embodiment of the variable correction weight threshold computation utilizes a comparison of selected imbalance correction weight plane locations to a set of reference imbalance correction weight plane locations, without requiring imbalance force measurements of the rotating body 22 or utilizing reference imbalance force limits $F_{max}$ or $M_{max}$. For example, the set of reference imbalance correction weight plane locations may correspond to the 15.0 inch diameter and 6.0 inch width dimensions previously described, associated with the "feel to the driver" equivalent imbalance force limits $F_{max}$ and $M_{max}$ caused by placing a 0.29 oz. static weight and 0.33 oz. of couple pair weights on a wheel.

The imbalance correction weight thresholds $W_{bs}$ and $W_{bd}$ are then determined as a change in "reference" weight threshold limits $W_{bs\_ref}$ and $W_{bd\_ref}$ as a function of the change in diameter and plane separation of the selected imbalance correction weight planes from the reference dimensions:

$$W_{bs} = W_{bs\_ref} * (D_{s\_ref}/D) \qquad \text{Equation (3)}$$

where: $W_{bs}$ represents the static weight threshold for the wheel under test; $W_{bs\_ref}$ represents the static weight threshold for the reference wheel (such as 0.29 oz); Ds represents the diameter of the static weight placement location of the wheel under test; and $D_{s\_ref}$ represents the diameter of the static weight placement location of reference wheel (such as 15.0 inches).

$$W_{bd} = W_{bd\_ref} * (D_{d\_ref}/D_d) * (W_{\_ref}/W) \qquad \text{Equation (4)}$$

where $W_{bd}$ represents the dynamic weight threshold for the wheel under test; $W_{bd\_ref}$ represents the dynamic weight threshold for a reference wheel (such as 0.33 oz); $D_d$ represents the diameter of the dynamic weight pair placement of the wheel under test; $D_{d\_ref}$ represents the diameter of the dynamic weight pair placement of reference wheel (such as 15.0 in.); W represents the plane separation of dynamic weights of the wheel under test; and $W_{\_ref}$ represents the plane separation of the dynamic weights of reference wheel (such as 6.0 in.).

For some rotating bodies 22, the inner and outer planes on which imbalance correction weights are to be placed could have different diameters, particularly when dealing with adhesive imbalance correction weights disposed on the inside of a wheel rim having an internal taper or steps along the profile. For this case, the value of $D_d$ utilized in Equation (2) is the average of the inner and outer plane diameters. Although this places the imagined "dynamic weight pair placement diameter" literally in mid air for the left plane and inside the wheel material for the right plane, it is only a temporary usage to compute the display threshold for the dynamic imbalance correction weight pair, and does not affect the accuracy of weight computations which utilize the actual inner and outer plane diameters as taught in U.S. Pat. No. 5,396,436 to Parker et al.

Finally, the static and dynamic imbalance correction weight vectors which are above the respective variable thresholds $W_{bs}$ and $W_{bd}$ are vectorially combined, as is known in the art, to produce a displayed representation of the inner and outer imbalance correction weight vectors, simultaneously correcting the rotating body for both static and moment imbalances.

An alternate method is to compute the weights as taught in U.S. Pat. No. 5,396,436 to Parker et al. from the static and moment imbalance vector components S> and C>, and weight placement dimensions A–AC, W, Ri, Ro; except if either one of the static or dynamic computed weight vectors is less than $W_{bs}$ or $W_{bd}$, respectively, the values for S> or C>, respectively are simply excluded from the weight computations.

A second alternate method is the case when the moment threshold $W_{bd}$ is exceeded is to apply the static imbalance correction even when $W_{bs}$ is not exceeded. Two imbalance correction weights will be applied to correct the couple imbalance in the rotating body, so this allows the final weight computation (which simultaneously corrects for both static and dynamic imbalance using the two imbalance correction weights) to possibly further reduce any static residual imbalance in the rotating body. The imbalance correction weights must be rounded to the nearest incremental weight amount so the portion needed to correct the small static component may be included in the displayed imbalance correction weight values.

It may be desirable, to adjust these limits to favor either static imbalance or dynamic (couple) imbalance. For instance, it is understood that passengers in a vehicle are less sensitive to a dynamic (couple) imbalance than a static imbalance. The values for $W_{bs\_ref}$ and $W_{bd\_ref}$ may be programmed into the balancer 10 or selected as a function of the particular class of vehicle undergoing service (i.e. passenger vehicle, sport utility vehicle, light truck), as a function of the type of tire being balanced, or based upon a database of specific vehicle types and tire combinations. Vehicles with lower sensitivity to imbalance forces can tolerate a greater imbalance level in the tire assemblies without perception by the average consumer.

An alternate embodiment of the present invention for enabling the placement of a single imbalance correction weight predicts a residual couple imbalance remaining in the rotating body 22 after application of the single (static) imbalance correction weight to either just the inner or just the outer correction plane. The predicted residual moment vector is computed by vector subtracting the moment vector that would be caused from a static weight vector at a chosen correction plane from the measured moment imbalance vector. It is important to note that when the two weight correction planes are at different diameters on the rotating body 22, such as when at least one of the weights is an adhesive weight to be applied to an internal surface of a wheels, the magnitude of the static correction weight vector for the left plane placement will be different than for the right plane placement.

Subsequent to a determination that the rotating body 22 requires imbalance correction, weight plane locations are selected and the balancer 10 then determines if a single imbalance correction weight can be applied which will result in an acceptable residual dynamic imbalance $M_{max}$ in the rotating body 22 according to the following procedure:

First, the correction weight plane locations A–AC, W, Ri, and Ro are determined for the rotating body, where "A" represents the distance measured to the inner weight plane of the rotating body 22; "AC" represents the distance from a reference plane of A to the origin of the coordinate systems; "W" represents the width between the weight planes of the rotating body 22; "Ri" represents the radius of the inner weight position; and "Ro" represents the radius of the outer weight position, as described in U.S. Pat. No. 5,396,436 to Parker et al.

Next, a residual imbalance prediction "$C_{res\_i}>$" is computed for only a static imbalance correction weight applied to the inner weight plane according to:

$$C_{res\_i}> = C> - ((S>/R_i)>*(A-AC)*R_i)> \qquad \text{Equation (5)}$$

where ">" denotes a vector, "C>" denotes a couple imbalance applied at the origin, and "S>" denotes static imbalance applied at the origin.

Similarly, a residual imbalance prediction "$C_{res\_o}>$" is computed for only a static imbalance correction weight applied to the outer weight plane according to:

$$C_{res\_o}> = C> - ((S>/R_o)>*(A-AC+W)*R_o)> \qquad \text{Equation (6)}$$

The lesser magnitude of $C_{res\_i}>$ and $C_{res\_o}>$ is selected, and if it is less than the dynamic imbalance moment limit or threshold $M_{max}$, the balancer 10 directs the operator to apply the static imbalance correction weight on the corresponding weight plane, preferably by providing a display of the static imbalance correction weight amount on a display associated with the corresponding plane, and displaying a zero value for the other plane.

When utilizing a pair of equal clip-on imbalance correction weights at the inner and outer planes of the rotating body 22, Ro=Ri=D/2, the static weight is the same for each plane, and Equations (5) and (6) reduce to:

$$C_{res\_i} >= C > -((S>/(D/2))>*(A-AC)*D/2)>$$ Equation (7)

$$C_{res\_o} >= C > -((S>/(D/2))>*(A-AC+W)*D/2)>$$ Equation (8)

The single weight computations can be applied to favor one possible balance plane based on the style of imbalance correction weights utilized.

For inner and outer plane clip-on balancing, the balancer 10 may be optionally configured to avoid directing the operator to install a single imbalance correction weight on the outer plane when it is possible to place a single imbalance correction weight only on the inner plane and maintain the residual dynamic imbalance moment below the dynamic imbalance moment limit or threshold $M_{max}$. This option is particularly suited for applications where the rotating body 22 or wheel does not physically support the ability to place a clip-on imbalance correction weight on the outer plane or where a customer simply does not want an imbalance correction weight on the outside of a wheel for aesthetic reasons.

For mix-weights balancing where a clip-on imbalance correction weight is to be applied to the inner plane and an adhesive imbalance correction weight is to be applied to the outer plane, the balancer 10 may optionally be configured to favor the inner clip-on imbalance correction weight location for the single weight (providing the residual dynamic imbalance moment prediction is below $M_{max}$) even if placement of an imbalance correction weight at the adhesive location would result in less residual dynamic imbalance. This option is particularly suited due to the relative ease of applying a clip-on imbalance correction weight versus an adhesive imbalance correction weight; cost savings associated with a clip-on imbalance correction weight; and for some rotating body 22 application (i.e. wheels), brake calipers fit so close to the inside surfaces of some wheels that adhesive weights cannot be used in that area.

To aid an operator in determining if a rotating body 22 has been balanced to within a threshold for both static imbalance and dynamic imbalance, the balancer 10 in an alternate embodiment is configured to provide the operator with a graphical illustration 300 of the measured imbalances relative to the threshold level of absolute imbalances on display 30, i.e. the couple imbalance threshold and the static imbalance threshold. Conventionally, such as shown in U.S. Pat. No. 5,915,274 to Douglas, weights required to correct static and dynamic imbalances are displayed relative to a fixed weight amount threshold to an operator on a bar graph. The fixed weight amount is based on the incremental weight size and the vehicle wheel geometry. In contrast, the graphical illustration 300 of the present invention displays information to an operator based upon absolute imbalances, and not on the incremental weight sizes and vehicle wheel geometry.

Figure 13:
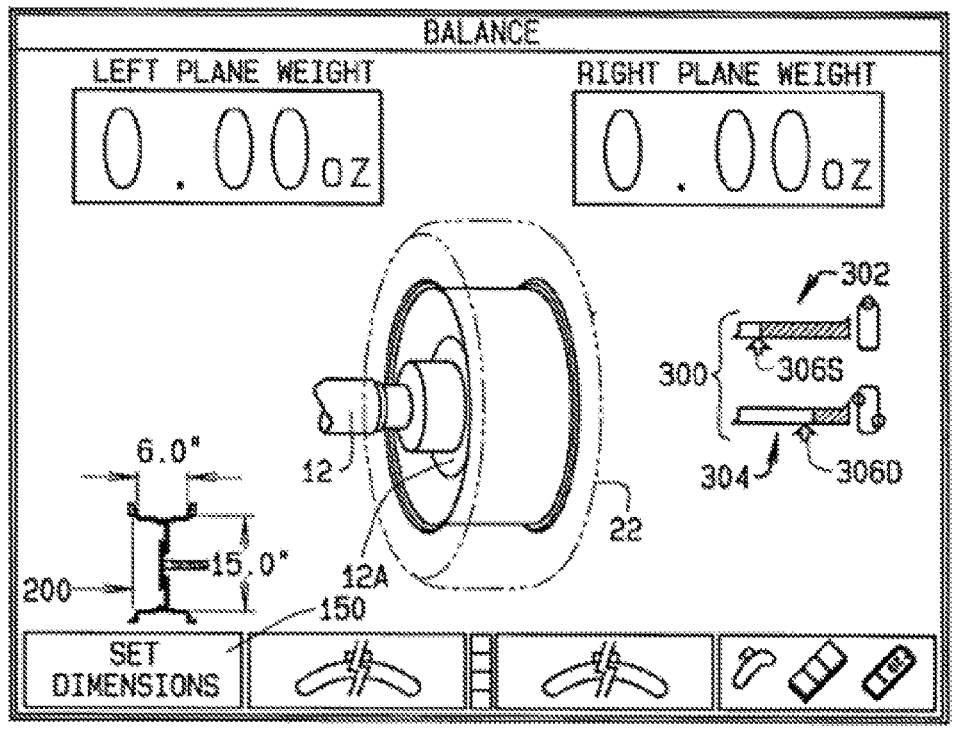
FIG. 13 is a representation of a display of the present invention showing a graphical presentation of the imbalance forces in the rotating body.
Figure 14:
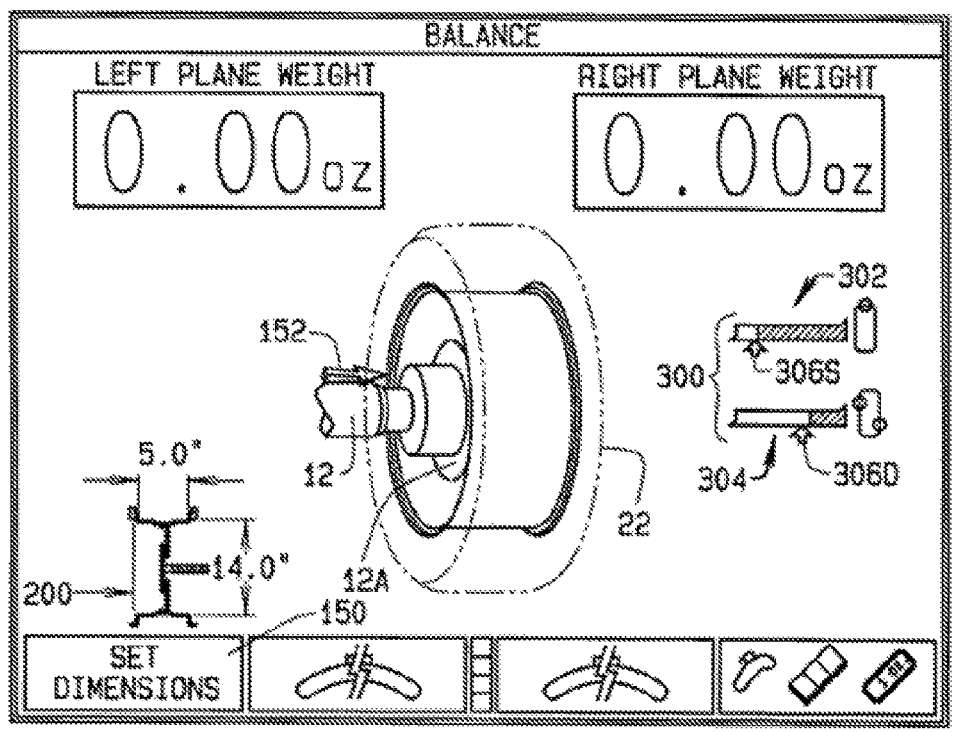
FIG. 14 is a representation of a display similar to FIG. 13, indicating that no additional weight is required on the wheel with a smaller diameter dimension and having the same imbalance.

Turning to FIGS. 13 and 14, a display 30 from a balancer 10 configured with the features of the present invention is shown first for a wheel having an axial length or width of 6.0 inches and a diameter of 15.0 inches. In this example, the imbalance present in the wheel for both static and dynamic imbalance is below a threshold level. This is illustrated with the graphical illustration 300, incorporating a sliding scale 302 for static imbalance, and a sliding scale 304 for dynamic imbalance. On each sliding scale 302 and 304, shown in FIG. 13, the computed imbalance amounts, as indicated by the arrows 306S and 306D, fall within the acceptable range, hence no imbalance correction weight amounts are indicated for the left and right correction planes. Further, as shown in FIG. 14, if the dimensions of the wheel are manually changed by the operator to indicate a 5.0 inch axial with and a 14.0 inch diameter, (corresponding to the change shown in FIG. 5) without re-measuring the imbalance, the measured imbalance in the wheel remains unchanged, as shown on the sliding scales 302 and 304. As a result, no imbalance correction weight amounts are indicated for the left and right correction planes.

Figure 15:
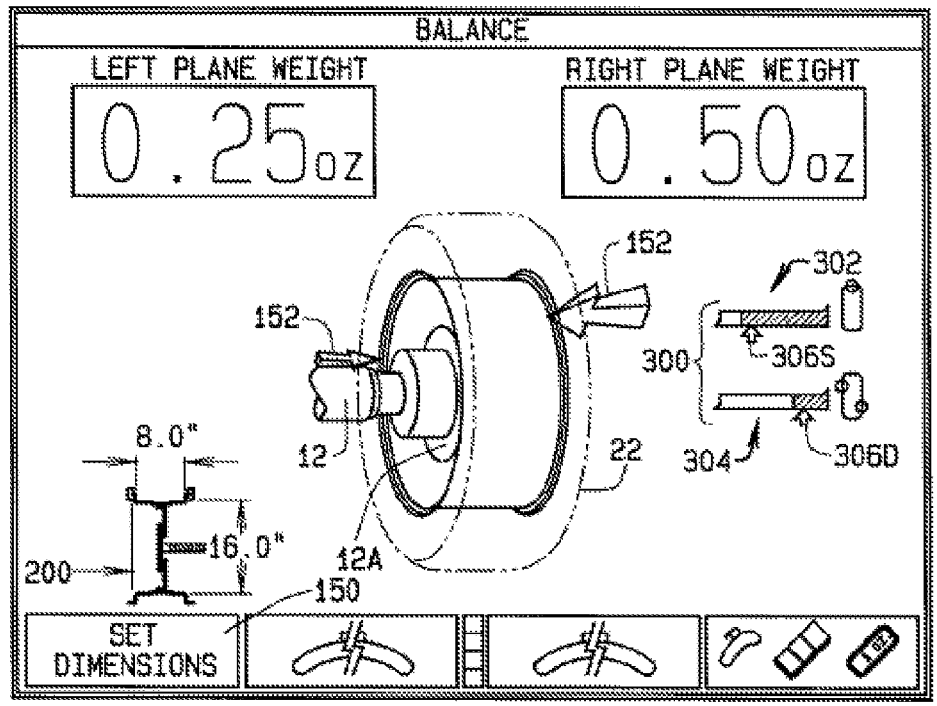
FIG. 15 is a representation of a display of the present invention showing a graphical presentation of the imbalance forces in the rotating body.
Figure 16:
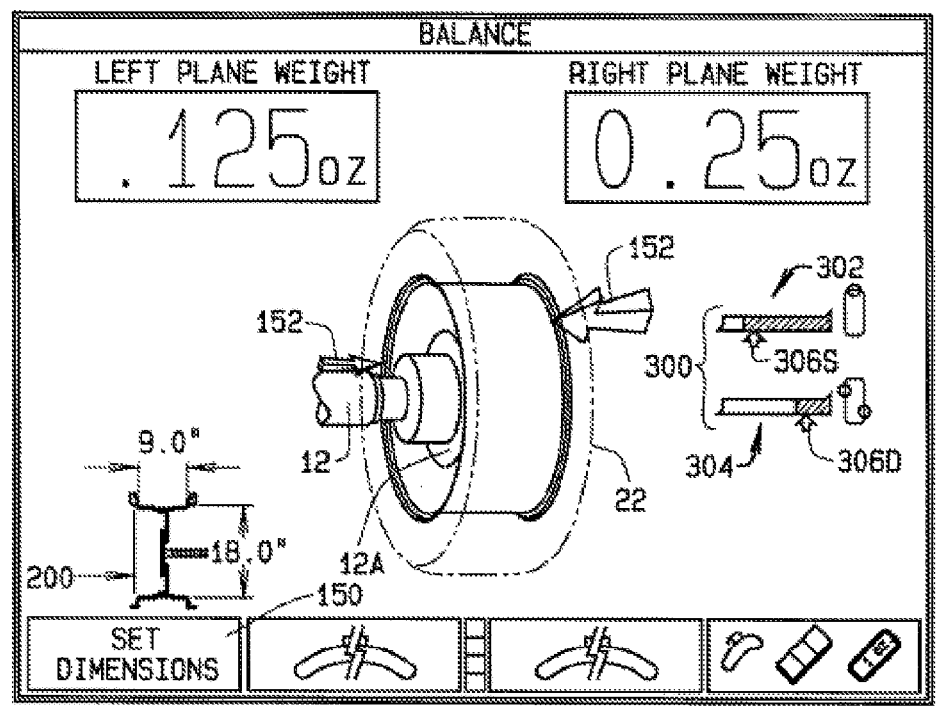
FIG. 16 is a representation of a display similar to FIG. 15, indicating that less weight is required on a wheel with larger width (weight plane separation) dimensions but having the same imbalance.

The method of the present invention also provides an advantage when balancing large wheels. For example, as shown in FIG. 15, a wheel having a 8.0 inch axial width, and a 16.0 inch diameter might have an imbalance above the threshold, as shown on sliding scales 302 and 304, resulting in the balancer displaying to an operator imbalance correction weights required for both the left and right imbalance correction planes. However, as shown in FIG. 16, if the dimensions of the wheel are manually changed by the operator to show an 18.0 inch diameter, without re-measuring the imbalance, less weight is required to correct the same imbalance. As a result, the balancer indicates to an operator that reduced weights in the left and right imbalance correction planes are still required to correct the imbalance which is above the imbalance threshold.

It is known that a rotating body 22 static imbalance force is a function of the imbalance mass, the radial distance of the imbalance mass from the axis of rotation, and the angular velocity of the rotating body 22. In a vehicle wheel application, where the rotating body 22 consists of a wheel rim and tire assembly, for any given vehicle speed, the angular velocity may be expressed as a function of the tire diameter or as a function of the tire diameter and the wheel rim diameter. Hence, in an alternate embodiment of the present invention, the imbalance force F, experienced by a vehicle from a rotating wheel assembly may be defined as:

$$F = \frac{\left(\frac{v}{\pi D_T}\right)^2 m D_W}{2}$$ Equation (9)

where v is the vehicle velocity, $D_T$ is the tire diameter, $D_W$ is the correction weight application diameter, which is equal to the wheel diameter for clip-on weights, and m is the imbalance mass. For example, if an acceptable imbalance correction threshold or "blind" for a wheel rim having a diameter $D_{W0}$ of 15.0" with a tire having a diameter $D_{T0}$ of 28.0" is 0.29 oz. ($m_0$), an equation for calculating an equivalent "blind" ($m_1$) for an assembly with the dimensions $D_{W1}$ and $D_{T1}$ is:

$$m_1 = \frac{m_0 D_{W0}}{D_{W1}} \left(\frac{D_{T1}}{D_{T0}}\right)^2$$ Equation (10)

Figure 17:
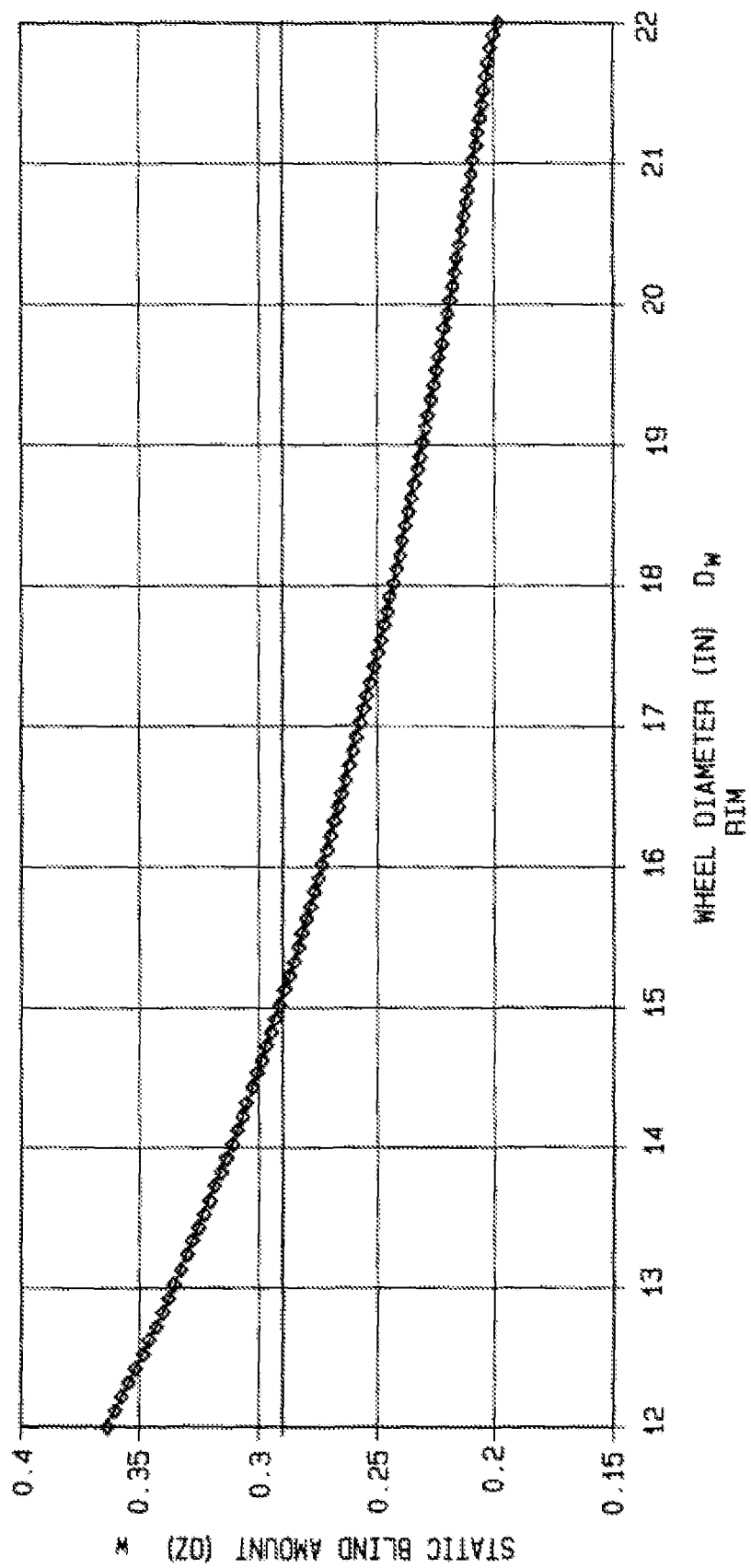
FIG. 17 is a two dimensional graphical representation of the blind amount versus wheel diameter for a static imbalance limit.
Figure 18:
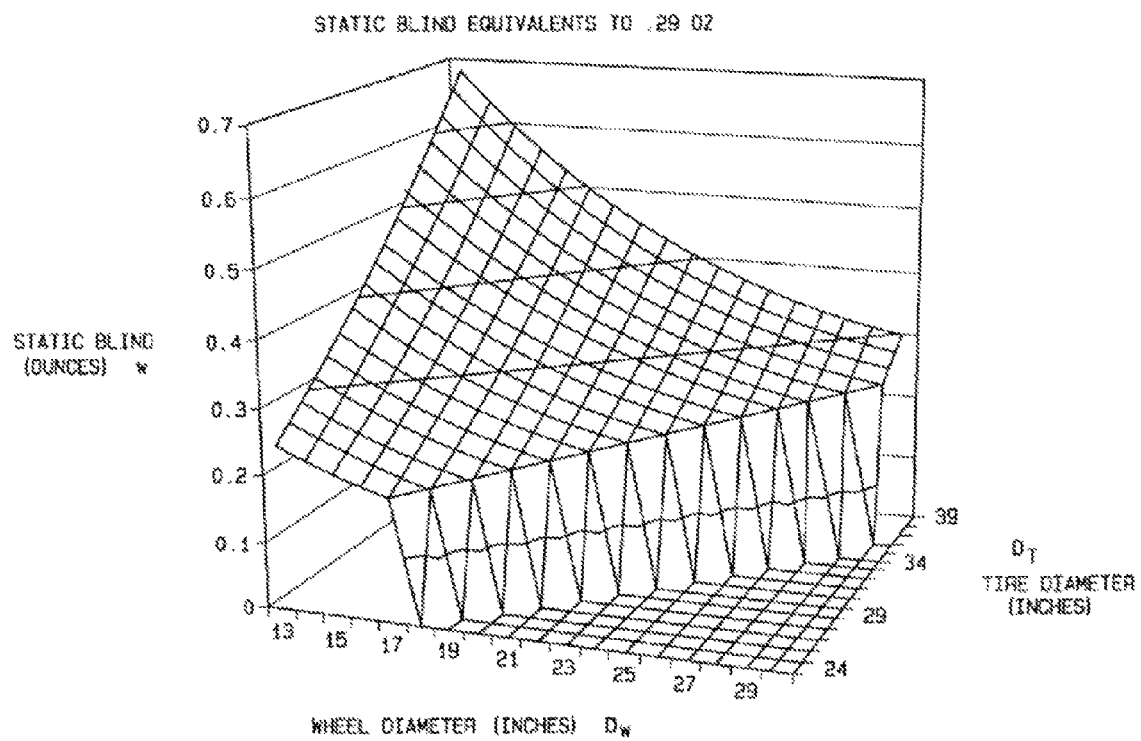
FIG. 18 is a surface plot representation of the blind amount compared with wheel diameter and tire diameter for a static imbalance limit.

Once an acceptable imbalance correction threshold or "blind" is established for a particular tire and rim combination, an equivalent imbalance correction threshold or "blind" may be automatically calculated using Equation (10) for a wide variety of wheel assemblies, providing an imbalance correction threshold curve, such as shown in FIG. 17 for wheel rim dimensions and in FIG. 18 for tire dimensions.

Utilizing the tire diameter $D_T$, and the wheel diameter $D_W$, wheel assemblies may be classified into predefined groupings. For example, performance wheel assemblies where $D_T-D_W$ is relatively small (~3.0 inches or less), touring wheel assemblies, where $D_T-D_W$ is between 3.0 in. and 5.0 in., and truck wheel assemblies, where $D_T-D_W$ is greater than 5.0 in. Each different predefined grouping may be provided with a different acceptable imbalance correction threshold or "blind" curve. Using Equation (10), the specific imbalance correction threshold or "blind" for a wheel assembly having specific dimensions may be automatically calculated, once a specific tire grouping and associated curve has been selected.

A similar analysis for the rotating body 22 couple imbalance force can be made. Where L is the wheel width, the imbalance couple (M) felt by the vehicle can be expressed as:

$$M = \left(\frac{v}{\pi D_T}\right)^2 wL\frac{D_W}{2} \quad \text{Equation (11)}$$

If an acceptable imbalance correction threshold or "blind" for a wheel assembly having a 15.0×6.0 inch wheel rim ($D_{W0} \times L_0$), with a 28.0 inch diameter tire ($D_{T0}$) installed thereon is 0.29 oz ($w_0$) then using Equation (11), and equivalent blind ($w_1$) for an assembly with the dimension $D_{W1}$, $D_{T1}$, and $L_1$ is:

$$w_1 = \frac{w_0 D_{w_0}}{D_{w_1}}\left(\frac{D_{T1}}{D_{T0}}\right)^2 \frac{L_0}{L_1} \quad \text{Equation (12)}$$

Figure 19:
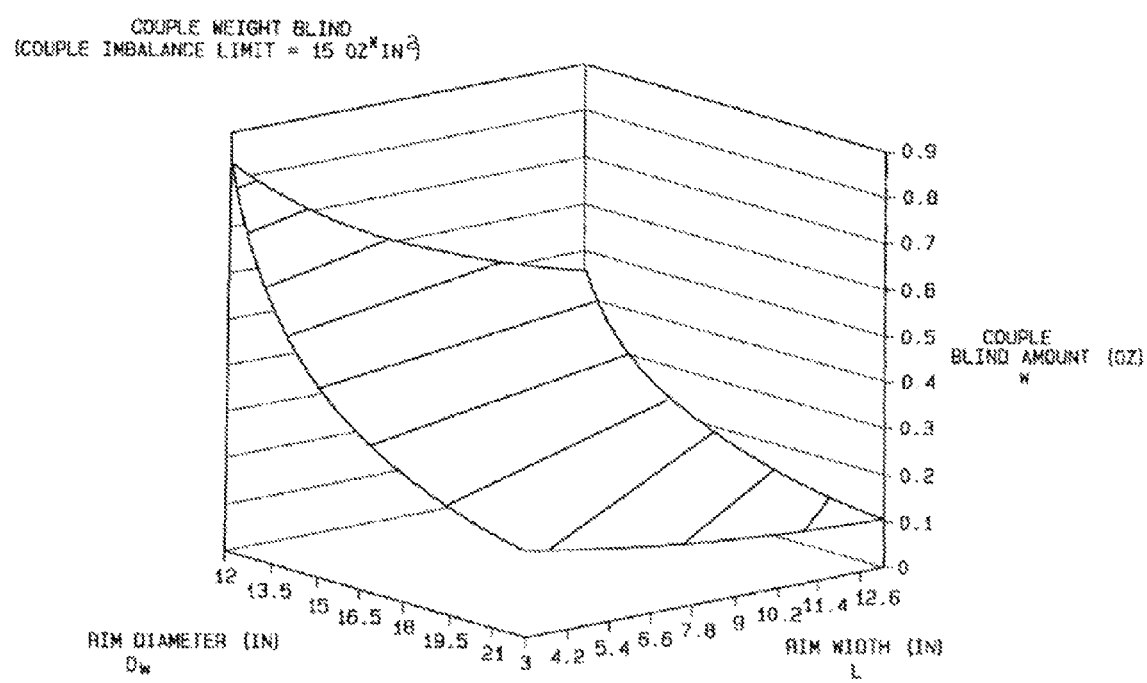
FIG. 19 is a surface plot representation of wheel rim diameter, wheel width, and couple blind amount for a couple imbalance limit.
Figure 20:
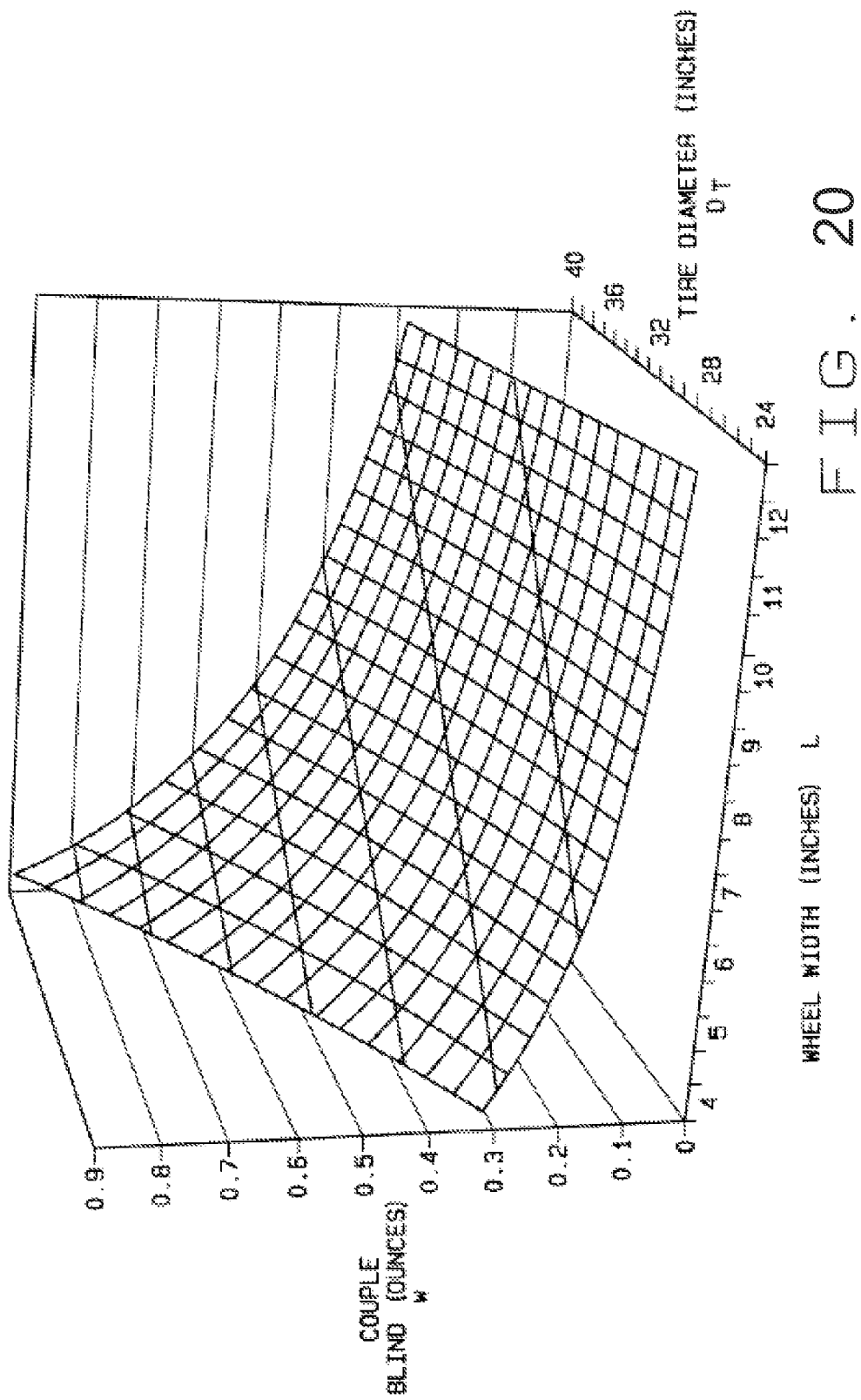
FIG. 20 is a surface plot similar to FIG. 19, for tire diameter, wheel width, and couple blind amount for a couple imbalance limit.

Once an acceptable couple imbalance correction weight threshold or "blind" is established for a particular tire and rim combination, an equivalent couple imbalance correction weight threshold or "blind" may be automatically calculated using Equation (12) for a wide variety of wheel assemblies, providing an couple imbalance correction weight threshold curve, such as shown in FIG. 19 for wheel rim dimensions and FIG. 20 for tire dimensions.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A vehicle wheel balancer for saving a quantity of correction weight used in performing a balancing operation on a vehicle wheel, the balancer comprising:
    at least one force sensor used for determining a magnitude of imbalance associated with an imbalance characteristic in the vehicle wheel; and
    a central processing unit coupled to said at least one force sensor, said central processing unit configured with program instructions to calculate an amount of correction weight required to correct said determined magnitude of imbalance to within a tolerance of a non-zero residual imbalance goal, said calculated amount of correction weight being sufficient to correct the determined magnitude of imbalance to an acceptable level which is selected to be less than an imbalance correction threshold and greater than a permitted residual imbalance associated with a zero imbalance goal, said amount of correction weight being materially less than an amount of correction weight calculated by an imbalance correction method seeking to achieve said zero imbalance goal said determined magnitude of imbalance, whereby a quantity of correction weight is saved in performing the balancing operation.

2. The vehicle wheel balancer of claim 1 wherein said central processing unit is further configured to calculate a measure of an imbalance correction weight required to correct said determined magnitude of imbalance to within a tolerance of zero imbalance; and
    wherein said central processing unit is further configured to calculate a difference between said calculated amount of correction weight required to correct said determined magnitude of imbalance to within a tolerance of a non-zero residual imbalance goal and said calculated measure of an imbalance correction weight required to correct said determined magnitude of imbalance to within a tolerance of zero imbalance.

3. The vehicle wheel balancer of claim 2 wherein said central processing unit is configured to store said calculated difference.

4. The vehicle wheel balancer of claim 2 wherein said central processing unit is configured to display said calculated difference to an operator as a measure of imbalance correction weight savings.

5. The vehicle wheel balancer of claim 1 wherein said imbalance characteristic in the vehicle wheel is a couple imbalance.

6. A vehicle wheel balancer that saves a quantity of imbalance correction weight during a balancing operation on a vehicle wheel, the balancer comprising:
    at least one force sensor used for determining a magnitude of imbalance associated with an imbalance characteristic in the vehicle wheel;
    a central processing unit coupled to said at least one force sensor, said central processing unit configured with a program to calculate an amount of imbalance correction weight less than an amount of imbalance correction weight calculated by a vehicle wheel balancer configured to seek a zero imbalance goal, such that a residual imbalance in the vehicle wheel following application of said calculated amount of imbalance correction weight to the vehicle wheel is not minimized, and a quantity of imbalance correction weight is saved during the balancing operation.

7. The vehicle wheel balancer of claim 5 wherein said central processing unit is further configured with a program to calculate a second amount of imbalance correction weight, said second amount of imbalance correction weight sufficient to reduce said determined magnitude of imbalance to within a tolerance of zero; and wherein said central processing unit is configured to determine a difference between said second amount of imbalance correction weight and said calculated amount of imbalance correction weight which is sufficient to reduce said determined magnitude of imbalance to an acceptable level, said determined difference representative of said quantity of imbalance correction weight saved during the balancing operation.

8. The vehicle wheel balancer of claim 6 wherein said central processing unit is configured to store said determined difference for at least one balancing operation.

9. The vehicle wheel balancer of claim 6 wherein said central processing unit is configured to provide a display of said imbalance correction weight savings.

10. The vehicle wheel balancer of claim 5 wherein said imbalance characteristic in the vehicle wheel is a couple imbalance.

* * * * *